(12) United States Patent
Sato et al.

(10) Patent No.: US 8,954,682 B2
(45) Date of Patent: *Feb. 10, 2015

(54) COMPUTER SYSTEM MANAGEMENT APPARATUS AND MANAGEMENT METHOD

(71) Applicant: Hitachi, Ltd., Tokyo (JP)

(72) Inventors: Takanori Sato, Yokohama (JP); Takato Kusama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,186

(22) Filed: Feb. 19, 2014

(65) Prior Publication Data

US 2014/0173194 A1 Jun. 19, 2014

Related U.S. Application Data

(63) Continuation of application No. 13/378,312, filed as application No. PCT/JP2011/062412 on May 30, 2011, now Pat. No. 8,667,220.

(51) Int. Cl.
*G06F 12/08* (2006.01)
*G06F 3/06* (2006.01)
*G06F 11/34* (2006.01)

(52) U.S. Cl.
CPC ............ *G06F 3/061* (2013.01); *G06F 12/0866* (2013.01); *G06F 3/0647* (2013.01); *G06F 3/067* (2013.01); *G06F 3/0685* (2013.01); *G06F 11/3485* (2013.01); *G06F 11/3433* (2013.01); *G06F 2201/88* (2013.01); *G06F 2201/885* (2013.01)
USPC ....................................................... 711/141

(58) Field of Classification Search
CPC . G06F 3/0689; G06F 3/0647; G06F 12/0866; G06F 3/067; G06F 3/0685; G06F 11/3485; G06F 11/3433
See application file for complete search history.

(56) References Cited

U.S. PATENT DOCUMENTS

| | | | |
|---|---|---|---|
| 5,966,726 | A | 10/1999 | Sokolov |
| 7,072,914 | B2 | 7/2006 | Cabrera et al. |
| 2006/0242112 | A1 | 10/2006 | Hikita |
| 2008/0005501 | A1 | 1/2008 | Watanabe et al. |

(Continued)

FOREIGN PATENT DOCUMENTS

| | | |
|---|---|---|
| JP | 2000-010740 | 1/2000 |
| JP | 2006-039942 | 2/2006 |

(Continued)

OTHER PUBLICATIONS

PCT International Search Report and Written Opinion on application No. PCT/JP2011/062412 dated Jun. 28, 2011; 11 pages.

*Primary Examiner* — Hiep Nguyen
(74) *Attorney, Agent, or Firm* — Foley & Lardner LLP

(57) ABSTRACT

The present invention measures an actual utilization frequency of data and controls a location of this data in a storage apparatus in a case where a host computer makes joint use of a storage apparatus and a cache apparatus. A portion of data used by an application program 1A is stored in a storage apparatus 2 and a cache apparatus 3. A management apparatus 4 detects an I/O load of a page (4A), and detects an I/O load of cache data (4B). The management apparatus 4 determines a corresponding relationship between the page and the cache data (4C), and adds the I/O load of the cache data to the I/O load of the page.

12 Claims, 33 Drawing Sheets

(56) References Cited

U.S. PATENT DOCUMENTS

2010/0115222 A1   5/2010  Usami
2010/0274826 A1  10/2010  Takata et al.
2011/0191537 A1*  8/2011  Kawaguchi et al. .......... 711/114
2012/0023305 A1*  1/2012  Satoyama et al. ............ 711/170

FOREIGN PATENT DOCUMENTS

| | | |
|---|---|---|
| JP | 2006-301892 | 11/2006 |
| JP | 2008-009829 | 1/2008 |
| JP | 2010-108341 | 5/2010 |
| JP | 2010-257094 | 11/2010 |

* cited by examiner

FIG. 7

| Cache read log table T 4 0 1 |||
| C 4 0 1 0 | C 4 0 1 1 | C 4 0 1 2 |
|---|---|---|
| Host name | Cache ID | Read time |
| Host HA | Cache CA | 2011/02/03  14:56:31.567 |
| Host HA | Cache CB | 2011/02/03  14:56:32.821 |
| Host HB | Cache CC | 2011/02/03  14:56:32.924 |
| Host HC | Cache CD | 2011/02/03  14:56:33.532 |
| . . . | . . . | . . . |

| Cache write log table T402 | | |
|---|---|---|
| C4020 | C4021 | C4022 |
| Host name | Cache ID | Write time |
| Host HA | Cache CA | 2011/02/03  14:56:25.362 |
| Host HA | Cache CB | 2011/02/03  14:56:35.324 |
| Host HB | Cache CC | 2011/02/03  14:56:36.241 |
| Host HA | Cache CA | 2011/02/03  14:56:39.246 |
| Host HA | Cache CB | 2011/02/03  14:56:40.123 |
| Host HB | Cache CC | 2011/02/03  14:56:40.255 |
| . . . | . . . | . . . |

| Page read log table T403 | |
|---|---|
| Page ID (C4030) | Read time (C4031) |
| Page PD | 2011/02/03  14:56:31.231 |
| Page PD | 2011/02/03  14:56:32.124 |
| Page PD | 2011/02/03  14:56:32.534 |
| Page PD | 2011/02/03  14:56:33.664 |
| . . . | . . . |

FIG. 10

| Page write log table T404 |||
| --- | --- | --- |
| C4040 | C4041 | C4042 |
| Volume ID | Page ID | Write time |
| 00:00:01 | Page PA | 2011/02/03  14:56:39.012 |
| 00:00:02 | Page PB | 2011/02/03  14:56:39.924 |
| 00:00:03 | Page PC | 2011/02/03  14:56:40.132 |
| 00:00:04 | Page PD | 2011/02/03  14:56:41.246 |
| . . . | . . . | . . . |

FIG. 11

| Host-logical volume mapping table T411 | |
|---|---|
| C4110 | C4111 |
| Host name | Logical volume ID |
| Host HA | 00:00:01 |
| Host HA | 00:00:02 |
| Host HB | 00:00:03 |
| Host HC | 00:00:04 |
| . . . | . . . |

FIG. 12

| Cache-page mapping table T412 | |
|---|---|
| Cache ID  C4120 | Page ID  C4121 |
| Cache CA | Page PA |
| Cache CB | Page PB |
| Cache CC | Page PC |
| . . . | . . . |

FIG. 13

| Page effective load table T 4 2 1 ||
| C 4 2 1 0 | C 4 2 1 1 |
| --- | --- |
| Page ID | Total number of effective I/Os |
| Page PA | 6788 |
| Page PB | 4546 |
| Page PC | 3243 |
| Page PD | 125 |
| . . . | . . . |

FIG. 29

| Cache-page mapping statistics table T 4 1 3 ||| 
|---|---|---|
| C 4 1 3 0 | C 4 1 3 1 | C 4 1 3 2 |
| Cache ID | Page ID | Number of mappings |
| Cache CA | Page PA | 3 |
| Cache CB | Page PB | 1 3 |
| Cache CC | Page PC | 5 0 |
| . . . | . . . | . . . |

COMPUTER SYSTEM MANAGEMENT APPARATUS AND MANAGEMENT METHOD

CROSS-REFERENCE TO RELATED PATENT APPLICATIONS

This application is a Continuation of U.S. application Ser. No. 13/378,312 (National Stage of PCT/JP2011/062412), filed Dec. 14, 2011, incorporated herein by reference in its entirety.

TECHNICAL FIELD

The present invention relates to a computer system management apparatus and management method.

BACKGROUND ART

In hierarchical storage technology, multiple types of storage devices of a storage apparatus are divided into tiers in accordance with performance. In hierarchical storage technology, the storage destination of data from a logical volume is changed to an appropriate tier based on the I/O (Input/Output) load with respect to this data. A tier change can be carried out either manually or automatically. When using hierarchical storage technology, storage devices having the performance required for data can be allocated with respect to this data only in the quantity that is needed. Therefore, the utilization efficiency of the storage apparatus can be improved.

Patent Literature 1 discloses a hierarchical storage technology, which can measure the I/O load for each piece of data included in a single file, and change the storage destination of the data in units of one file.

Patent Literature 2 discloses hierarchical storage technology, which can measure the I/O load for each piece of data included in a virtual storage area called a page, and change the storage destination of the data in units of one page.

CITATION LIST

Patent Literature

[PTL 1]
Japanese Patent Application Laid-open No. 2010-257094
[PTL 2]
Japanese Patent Application Laid-open No. 2010-108341

SUMMARY OF INVENTION

Technical Problem

In recent years, there have been cases where a host computer that runs application programs uses a cache apparatus provided separately from the storage apparatus. For example, in the case of an application program for which fast response time to a user terminal is considered important, a cache apparatus with high I/O performance can be provided. This application-running host computer stores frequently used data in both the storage apparatus and the cache apparatus. Rather than reading this data from the storage apparatus, the application program on the host computer can shorten the read time by reading this data from the cache apparatus.

When hierarchical storage technology is applied to a computer system, which comprises a cache apparatus, problems such as those described hereinbelow occur.

In a case where data included in a certain page is also stored in a cache apparatus, the host computer application program reads this data from the cache apparatus. Therefore, there is a high likelihood that the I/O load with respect to the page comprising the cached data will be measured as low compared to a data-containing page read out from the storage apparatus. This is because the storage apparatus does not know that the data is being read from the cache apparatus.

Since the I/O load of a page, which comprises data stored in the cache apparatus, will be evaluated as low by the storage apparatus, it becomes highly likely that this page will be allocated to a tier with a lower performance than the tier in which the page should originally have been allocated. Because of the high read frequency, despite the fact that data is stored in the cache apparatus, in the storage apparatus, a page containing this data is allocated to a low-performance tier.

Alternatively, in a case where the cache capacity of the cache apparatus has been exhausted, the cache apparatus deletes a portion of the stored data. This is called a cache out process. Executing a cache out process makes it possible to increase free cache capacity.

A case in which the page comprising the data stored in the cache apparatus has been allocated to a lower-level tier and a cache out process was executed with respect to this data will be considered. In this case, the application program on the host computer must read this data from the storage apparatus. However, the data read will take time because this data has been allocated to a lower-level tier inside the storage apparatus. Read performance with respect to this data will deteriorate until this data is either reallocated to a higher-level tier or stored in the cache apparatus once again. Therefore, the response performance with respect to the user terminal using this application program will drop off, and customer satisfaction will decline.

In addition, in a case where the application program on the host computer attempts to update data that has been cached out, a write process to the page allocated to the lower-level tier must be performed. Therefore, the write performance for this data will also deteriorate.

With the foregoing problems in view, an object of the present invention is to provide a computer system management apparatus and management method, which make it possible to measure a data utilization status as accurately as possible in a case where a host computer is using both a storage apparatus and a cache apparatus. Another object of the present invention is to provide a computer system management apparatus and management method, which make it possible to associate as accurately as possible data stored in a storage area in a logical volume with data stored in a cache apparatus, and to control the storage destination of this data based on the data utilization status.

Solution to Problem

A management apparatus for managing a computer system related to one aspect of the present invention is a management apparatus for managing a computer system equipped with a storage apparatus for providing a logical volume to a host computer, and a cache apparatus, which is used by the host computer, and a portion of data stored in a storage area of a prescribed size in the logical volume is stored in the cache apparatus as cache data, the management apparatus comprises a microprocessor, a storage device for storing a prescribed computer program to be used by the microprocessor, and a communication interface circuit for communicating with the host computer and the storage apparatus, wherein, by executing the prescribed computer program, the microprocessor detects a first access request by the host computer with respect to data in a storage area in the logical volume, detects a second access request by the host computer with respect to the cache data in the cache apparatus, detects a corresponding relationship between the data of the storage area in the logical volume and the cache data of the cache apparatus, and computes the total number of access requests with respect to the data of the storage area based on the first access request and the second access request.

The microprocessor may send a prescribed instruction to the storage apparatus based on the total number of access requests.

The prescribed instruction is an instruction for reallocating the data of the storage area based on the total number of access requests, and the storage apparatus may allocate the data of the storage area to a physical storage area of a prescribed tier in accordance with the prescribed instruction.

The first access request may include both a read request and a write request with respect to the storage area data, the second access request may include a read request with respect to the cache data, and the total number of access requests may include the total number of read requests obtained by totaling the number of read request with respect to the data of the storage area and the number of read request with respect to the cache data corresponding to the storage area, and the number of the write request with respect to the data stored in the storage area.

The prescribed size may differ from a size of the cache data, and the microprocessor may detect the corresponding relationship between the data of the storage area and the cache data based on a first time at which the host computer updates the cache data in the cache apparatus, and a second time at which the host computer updates the data of the storage area in the logical volume.

In a case where the second time falls within a prescribed time from a previous first time to a latest first time, the microprocessor may determine that there is a corresponding relationship between the data of the storage area updated at the second time and the cache data updated at the latest first time.

Cache update history management information for managing update history of the cache data by the host computer, and storage area update history management information for managing update history of the storage area by the host computer are stored in the storage device, and the microprocessor, in a case where it has been ascertained, based on the cache update history management information and the storage area update history management information, that the host computer, which updates the cache data at the latest first time, and the host computer, which updates the data in the storage area at the second time, are the same, the microprocessor may determine that there is a corresponding relationship between the data in the storage area updated at the second time and the cache data updated at the latest first time.

Corresponding relationship management information for managing the corresponding relationship between the data of the storage area in the logical volume and the cache data of the cache apparatus is stored in the storage device, and the corresponding relationship management information includes information showing reliability of each corresponding relationship, and in a case where there are multiple corresponding relationships between the data of the storage area data and the cache data, the microprocessor may select any one of the corresponding relationships based on the information showing reliability.

The present invention may also be treated as either a computer program for managing a computer system or as a computer system.

BRIEF DESCRIPTION OF DRAWINGS

FIG. 7 shows a cache read log table.
FIG. 8 shows a cache write log table.
FIG. 9 shows a page read log table.
FIG. 10 shows a page write log table.
FIG. 11 is the configuration of a host-logical volume mapping table showing the corresponding relationship between the host computer and the logical volume.
FIG. 12 is the configuration of cache-page mapping table showing the corresponding relationship between cache data and a page.
FIG. 13 shows a page effective load log table.
FIG. 29 is cache-page mapping statistics table.

DESCRIPTION OF THE EMBODIMENTS

The embodiment of the present invention will be explained below by referring to the attached drawings. However, it should be noted that this embodiment is merely one example for realizing the present invention, and does not limit the technical scope of the present invention.

In this specification, information used in the embodiment is explained using the expression "aaa table", but the present invention is not limited to this, and, for example, other expressions, such as "aaa list", "aaa database" or "aaa queue" may also be used. The information used in this embodiment may also be called "aaa information" to show that this information is not dependent on a data structure.

When explaining the content of the information used in this embodiment, expressions such as "identification information", "identifier", "name" and "ID" may be used, but these expressions are interchangeable.

In addition, in the explanations of the processing operations of this embodiment, "computer program" or "module" may be explained as the doer of the action (the subject). The program or the module is executed by a microprocessor. The program or the module executes a stipulated process while using a memory and a communication port (a communication control apparatus). Therefore, the processor may also be considered as the doer of the operation (the subject). In addition, a process may be regarded as a process that is carried out by a management server or other such computer. Furthermore, either all or a portion of the computer program may be realized in accordance with dedicated hardware. The computer program may be installed in the computer in accordance with either a program delivery server or a storage medium.

Figure 1:
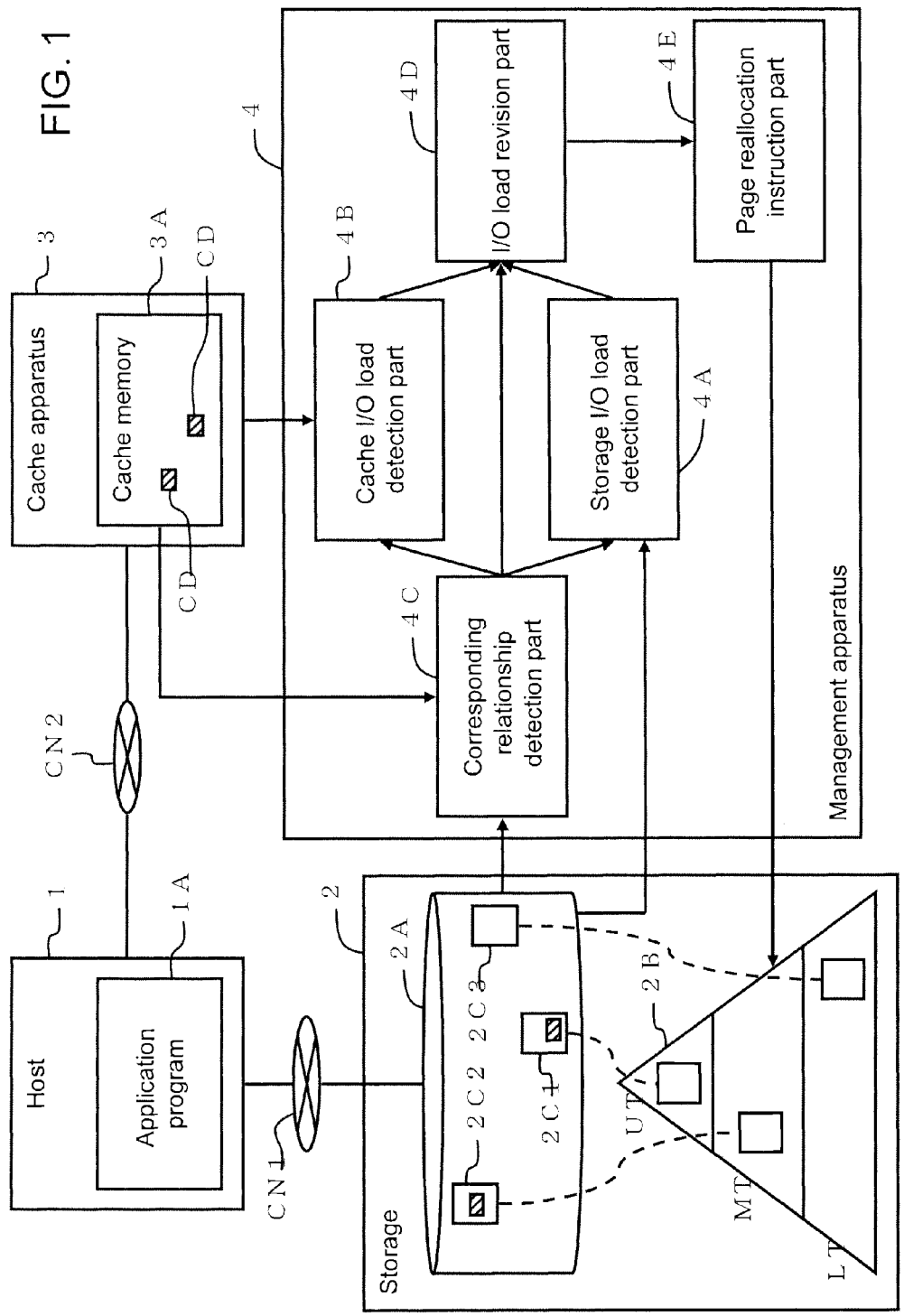
FIG. 1 is an illustration showing an overview of the embodiment.

FIG. 1 shows an overview of the embodiment in its entirety. As shown in FIG. 1, the computer system comprises at least one host computer (hereinafter, host) 1, at least one storage apparatus 2, at least one cache apparatus 3, and at least one management apparatus 4.

The host 1 and the storage apparatus 2, for example, are coupled via a communication network CN1 like a FC-SAN (Fibre Channel-Storage Area Network) or an IP-SAN (Internet Protocol-SAN) to allow two-way communications. The host 1 and the cache apparatus 3, for example, are coupled via a communication network CN2 like a LAN (Local Area Network) of the Internet to allow two-way communications. The management apparatus 4 is coupled at the least to the storage apparatus 2 and the cache apparatus 3 via a communication network like a LAN. In addition, the management apparatus 4 and the host 1 may also be coupled via a LAN or the like.

An application program 1A runs on the host computer 1. The application program 1A, for example, can include a mail-order system, a video delivery system, a music delivery system, or a customer management system.

The storage apparatus 2, for example, comprises at least one logical volume 2A, and multiple storage devices 2B. The storage apparatus 2 also comprises a controller not shown in the drawing, but this controller has been omitted from FIG. 1.

As the multiple storage devices 2B, for example, various types of devices that are capable of reading and writing data, such as a hard disk device, a semiconductor memory device, an optical disk device, a magneto-optical disk device, a magnetic tape device, and a flexible disk device can be used.

In a case where a hard disk device is used, for example, FC (Fibre Channel) disks, SCSI (Small Computer System Interface) disks, SATA disks, ATA (AT Attachment) disks, and SAS (Serial Attached SCSI) disks can be used. Furthermore, for example, various types of storage devices, such as a flash memory, a FeRAM (Ferroelectric Random Access Memory), a MRAM (Magnetoresistive Random Access Memory), an Ovonic Unified Memory, and a RRAM (Resistance RAM) can also be used. In addition, for example, the configuration may also be such that different types of storage devices are intermixed, such as a flash memory device and a hard disk drive.

The multiple storage devices 2B are divided into multiple tiers in accordance with the response performance thereof. In FIG. 1, for example, three tiers are shown. An upper-level tier UT is a tier configured from a relatively high-performance storage device(s). A mid-level tier MT is a tier configured from a relatively medium-performance storage device(s). A lower-level tier LT is a tier configured from a relatively low-performance storage device (s).

A RAID (Redundant Arrays of Inexpensive Disks) group is created in accordance with multiple storage devices belonging to each tier, and data is stored in units of pages in the physical storage area of this RAID group.

The logical volume 2A manages data in page units as a "prescribed size storage area". The size of a page 2C, for example, is MB grade, and is larger that the size of the cache data CD (for example, from several hundred to several KB), which will be explained further below. The logical volume 2A address space is partitioned and managed in page units. The data of each page 2C is stored in the storage device 2B of a tier that is determined to be appropriate from among the tiers UT, MT and LT in accordance with the I/O load.

Since the response performance of the upper-level tier UT is high, the data in a page 2C1 having a high access frequency is stored in a storage device of the upper-level tier UT. Since the response performance of the lower-level tier LT is low, the data in a page 2C3 having a low access frequency is stored in a storage device of the lower-level tier LT. Data in a page 2C2 having an access frequency that falls between the access frequency of the data allocated to the upper-level tier UT and the access frequency of the data allocated to the lower-level tier LT is allocated to the mid-level tier MT. The access frequency is the I/O load.

The cache apparatus 3, for example, is configured by loading cache management software into a server computer. The cache apparatus 3 holds data CD delivered from the host 1 in a cache memory 3A. As described above, the size of the cache data CD is smaller than the page size. Therefore, a portion of the data inside the page 2C is stored in the cache memory 3A as the cache data CD.

In a case where the free capacity of the cache memory 3A is equal to or less than a prescribed value, the cache apparatus 3 deletes cache data CD selected in accordance with a prescribed criteria. The cache data selected in accordance with the prescribed criteria, for example, can be the cache data having the oldest latest access time, or the cache data with the lowest access frequency within a prescribed period of time.

The management apparatus 4, for example, is configured by loading management software into a server computer. The management apparatus 4, for example, comprises a storage I/O load detection part 4A, a cache I/O load detection part 4B, a corresponding relationship detection part 4C, an I/O load revision part 4D, and a page reallocation instruction part 4E.

The storage I/O load detection part 4A detects a read request and a write request by the host 1 with respect to the data of the page 2C. The storage I/O load detection part 4A, for example, may also be described as the first access request detection part.

The cache I/O load detection part 4B detects a cache data read request and write request by the host 1. The cache I/O load detection part 4B may also be described as the second access request detection part. The I/O load is the number of read requests and write requests.

The corresponding relationship detection part 4C detects the corresponding relationship between the page 2C data and the cache data CD. The corresponding relationship detection part 4C determines the page 2C data to which the cache data CD inside the cache apparatus 3 corresponds, and stores this determination result.

The I/O load revision part 4D computes the I/O load of the page 2C data more accurately by adding the I/O load with respect to the cache data CD corresponding to this page 2C data to the I/O load with respect to the page 2C detected by the storage I/O load detection part 4A. The I/O load revision part 4D, for example, may also be described as the total access requests computation part.

The host 1 also stores data that is frequently used by the application program 1A in the cache memory 3A of the cache apparatus 3. The application program 1A reads from the cache apparatus 3 data, which requires that a response be sent at high speed to a not-shown user terminal, and which is being held in both the storage apparatus 2 and the cache apparatus 3. In a case where updating in performed, both the page 2C data of the storage apparatus 2 and the cache data CD are updated.

Therefore, the number of data updates will be the same for the page 2C data and the cache data CD. However, the number of data reads will be larger for the cache data CD, and the number of reads for the page 2C, which comprises the data corresponding to the cache data CD, will be smaller. The I/O load revision part 4D revises the number of read requests by adding the number of reads for the cache data CD corresponding to this page 2C data to the number of page 2C data reads to resolve an error resulting from an imbalance in the number of data reads.

The page reallocation instruction part 4E instructs the storage apparatus 2 to perform a page 2C reallocation based on the revised I/O load. The page reallocation instruction part 4E may also be described as the data reallocation instruction part. Information identifying the reallocation-target page 2C and information denoting the revised I/O load with respect to the reallocation-target page are included in the instruction from the page reallocation instruction part 4E to the storage apparatus 2.

The storage apparatus 2, upon receiving an instruction from the page reallocation instruction part 4E, changes the allocation-destination tier of the page 2C in accordance with this instruction. A page 2C with a low I/O load will be allocated to a tier with lower performance than the tier to which this page 2C currently belongs. A page with a high I/O load will be allocated to a tier with higher performance than the tier to which this page 2C currently belongs.

In this embodiment, which is configured like this, in a computer system in which the host 1 uses both the storage apparatus 2 and the cache apparatus 3, the I/O load related to data stored in a page 2C inside the storage apparatus 2 can be correctly assessed. Therefore, in this embodiment, it is possible to allocate a page inside the storage apparatus 2 to the proper tier based on this correct assessment.

As a result of this, even in a case where the cache data CD has been deleted from the cache apparatus 3, the data corresponding to the this deleted cache data CD is stored in the proper tier inside the storage apparatus 2 based on the actual I/O load. Therefore, the host 1 is able to read targeted data relatively quickly from the storage apparatus 2 even when the cache data CD has been deleted from the cache apparatus 3.

Thus, in this embodiment, in a case where the host 1 uses both the storage apparatus 2 and the cache apparatus 3, it is possible to correctly assess the utilization status of the data, and to store the data in a tier that corresponds to this data. For this reason, in this embodiment, even in a case where the cache data CD has been deleted, the host 1 application program 1A is able to provide service to a not-shown user terminal without much of a drop in response performance.

In addition, in this embodiment, since the management apparatus 4 determines the corresponding relationship between the cache data CD and the page 2C data and measures the actual utilization status of the page 2C data, the storage apparatus 2 and the cache apparatus 3 need not be aware of one another. That is, it is possible to correctly assess the utilization status of the page 2C data and, based on this assessment, to allocate the page 2C to the proper tier without changing the control programs of the storage apparatus 2 and the cache apparatus 3. In addition, the host 1 application program 1A may also be configured the same as always.

FIRST EXAMPLE

A first example will be explained by referring to FIGS. 2 through 27. First, the corresponding relationship between this example and FIG. 1 will be explained. The host 1 corresponds to host 10, the storage apparatus 2 corresponds to storage apparatus 20, the cache apparatus 3 corresponds to cache apparatus 30, and the management apparatus 4 corresponds to management server 40. The communication network CN1 corresponds to communication network CN10, and the communication network CN2 corresponds to communication network CN20. The logical volume 2A corresponds to logical volume 210 of FIG. 2, the page 2C corresponds to page 211 of FIG. 2, and the storage device 2B corresponds to storage devices 250A, 250B and 250C of FIG. 2. The upper-level tier UT corresponds to the upper-level tier 251A of FIG. 2, the mid-level tier MT corresponds to the mid-level tier 251B of FIG. 2, and the lower-level tier LT corresponds to the lower-level tier 251C of FIG. 2. The cache data CD corresponds to the cache data 331 of FIG. 5.

In this example, a management server 40 for optimizing the utilization status of a disk tier 251A, a disk tier 251B, and a disk tier 251C inside a storage apparatus 20 in a computer system in which a host 10, which is running an application program 11, uses a cache apparatus 30 disposed externally of the a storage apparatus 20, will be explained.

Figure 2:
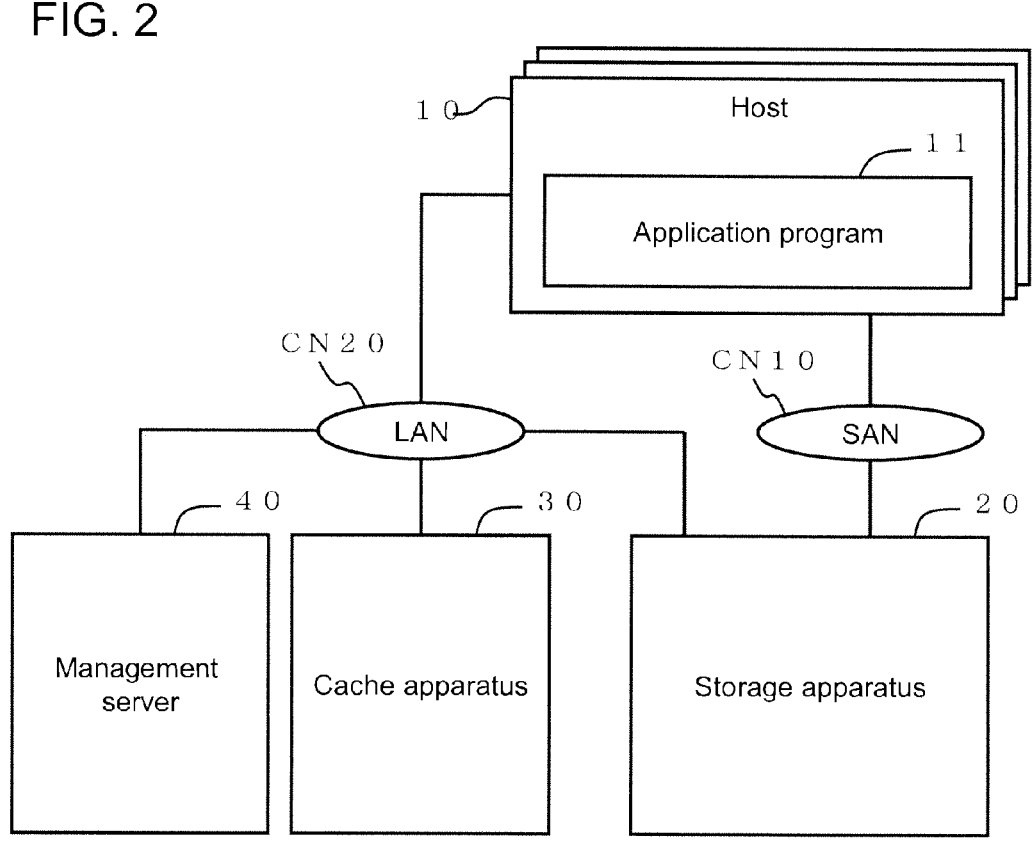
FIG. 2 shows the entire configuration of the computer system.

FIG. 2 is a diagram showing the overall configuration of the system. The computer system, for example, comprises multiple hosts 10, at least one storage apparatus 20, at least one cache apparatus 30, and at least one management server 40.

The host 10 is coupled to the storage apparatus 20 via a SAN CN10. The host 10, the storage apparatus 20, and the cache apparatus 30 are coupled to the management server 40 via a LAN CN 20. Furthermore, although omitted from the drawing, the host 10 is coupled to multiple user terminals via a communication network such as either the Internet or a LAN.

The host 10 executes the application program 11 therein-side. For example, in a case where the application program 11 is an online shopping application or the like, information, such as data on products to be sold and the user account data of buyers, must be made permanent. Making the information (data) permanent signifies holding the information (data) for a long period of time. The host 10 writes data that must be made permanent like this to the storage apparatus 20. The host 10 reads the data from the storage apparatus 20 as needed.

The host 10 not only uses the storage apparatus 20 but also the cache apparatus 30 as a data storage destination. For example, in a case where the application program 11 is an online shopping application, and a specific product from among the products handled is especially popular, the data of this product will be referenced frequently.

It is preferable that data related to highly popular products like this be read at high speed since this data is frequently referenced. Consequently, the developer of the application program 11 predicts beforehand the data that will probably have to be read at high speed. The developer can design the application program 11 in advance so as to be able to write data expected to require high-speed reads in both the storage apparatus 20 and the cache apparatus 30. Since the cache apparatus 30 is able to read data at high speed, the deterioration of the response performance of the application program 11 can be held in check.

Figure 3:
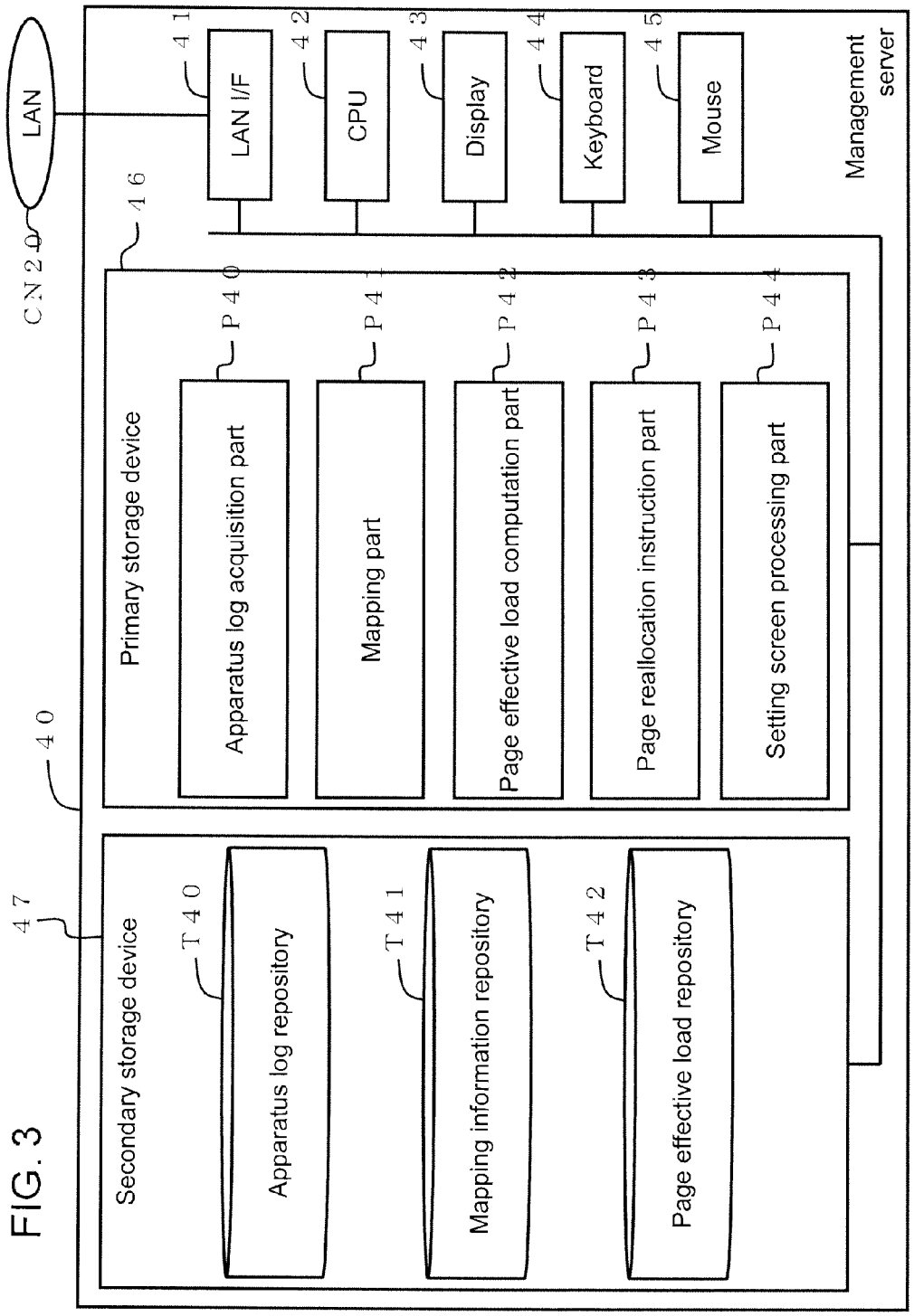
FIG. 3 shows the configuration of a management server.

FIG. 3 is a diagram showing the detailed configuration of the management server 40. The management server 40, for example, comprises a communication device 41, a microprocessor 42, a display 43, a keyboard 44, a mouse 45, a primary storage device 46, and a secondary storage device 47.

The management server 40 is able to carry out two-way communications with the host 10, the storage apparatus 20, and the cache apparatus 30 via the communication device 41. The CPU 42 executes respective processes, which will be described further below, using an operating system (not shown in the drawings) and various programs P40, P41, P42, P43, and P44 stored in the primary storage device 46.

An apparatus log acquisition part P40 is a computer program for acquiring an access log from the storage apparatus 20 and the cache apparatus 30. The apparatus log acquisition part P40, together with an apparatus log repository T40, which will be described further below, realizes the storage I/O detection part 4A and the cache I/O detection part 4B shown in FIG. 1.

A mapping part P41 is a computer program for managing the corresponding relationship between the host 10 and the logical volume 210, and the corresponding relationship between a page and a cache. The corresponding relationship between the host 10 and the logical volume 210 is configured manually by the system administrator. The corresponding relationship between a page and the cache is created automatically. This creation method will be described further below. The mapping part P41, together with a mapping information repository T41, which will be described further below, realizes the corresponding relationship detection part 4C of FIG. 1.

A page effective load computation part P42 is a computer program for computing the actual I/O load with respect to the data of a page 211. The page effective load computation part P42 computes for each page of each logical volume 210 the I/O load that should actually occur with respect to the page based on the number of writes to the page, the number of reads from this page, and the number of cache data 331 reads corresponding to the data comprising this page. The page effective load computation part P42, together with a page effective load repository T42, which will be described further below, realizes the I/O load revision part 4D of FIG. 1.

A setting screen processing part P44 is a computer program for creating a setting screen to be displayed on a display 43 and receiving information to be inputted to the setting screen by the user. Furthermore, this example shows a configuration in which user interface means, such as the display 43 and a keyboard 44, is provided in the management server 40, but instead of this, the configuration may also be such that a management terminal is coupled to the management server 40. The management terminal, for example, can comprise a personal computer, a portable information terminal, or a mobile telephone. The user can issue an instruction to the management server 40 and display information by way of a display, a keyboard and the like provided in the management terminal. Furthermore, the configuration may also be such that a voice input device is provided, and the user is able to issue an instruction to the management server 40 by voice.

The secondary storage device 47 stores an apparatus log repository T40, a mapping information repository T41, and a page effective load repository T42. The apparatus log repository T40 stores data used by the apparatus log acquisition part P40. The mapping information repository T41 stores data used by the cache-page mapping part P41. The page effective load repository T42 stores data used by the page effective load computation part P42.

Figure 4:
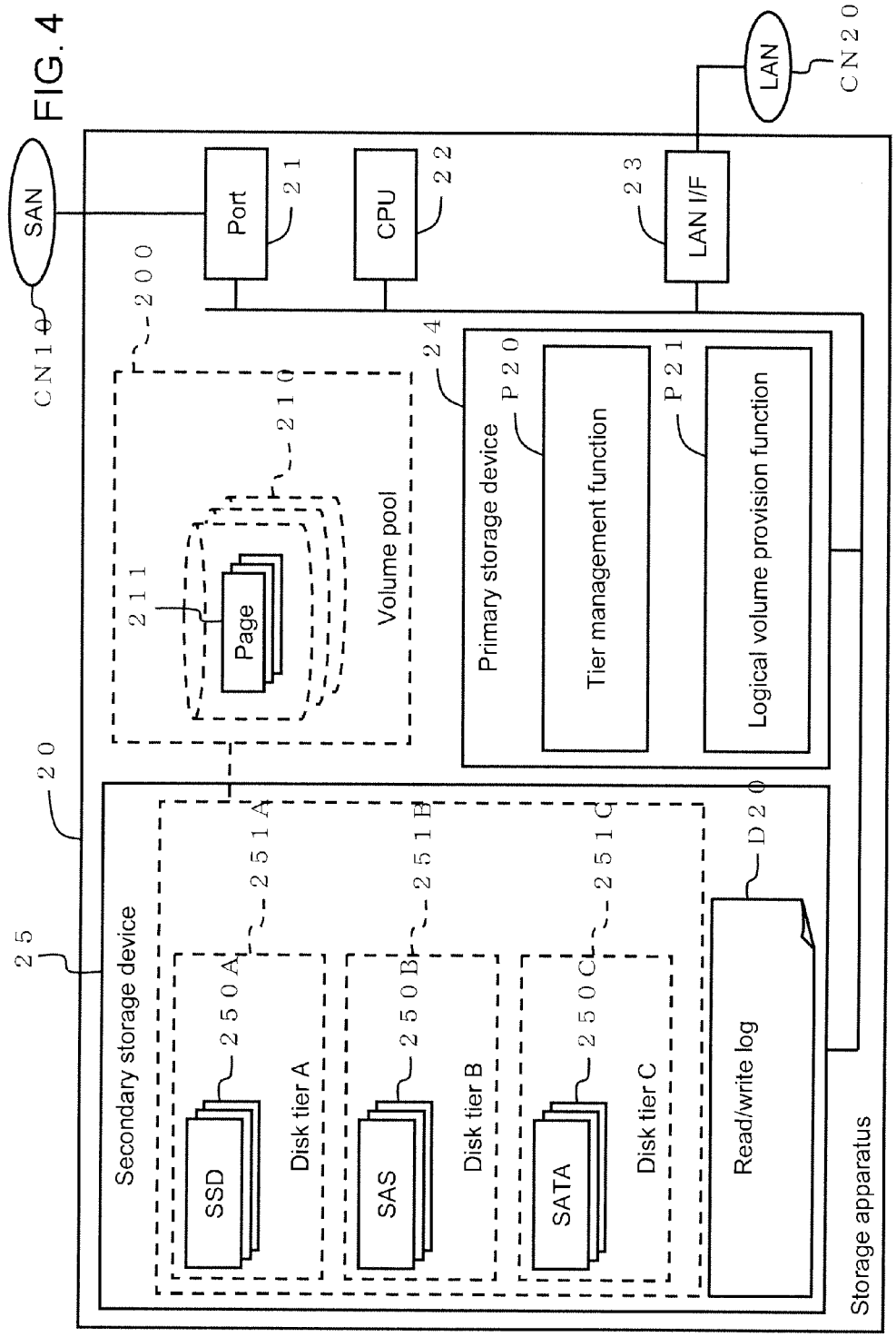
FIG. 4 shows the configuration of a storage apparatus.

FIG. 4 is a diagram showing the detailed configuration of the storage apparatus 20. The solid lines in FIG. 4 denote physical entities. The dashed lines in FIG. 4 denote a concept for consolidating either logical elements or physical entities.

The storage apparatus 20, for example, comprises a port 21, a CPU 22, a communication device 23, a primary storage device 24 and a secondary storage device 25.

The storage apparatus 20 is coupled to a SAN CN10 via the port 21. The storage apparatus 20 receives a command from the host 10 via the SAN CN10, and sends a processing result of this command to the host 10 via the SAN CN10.

The storage apparatus 20 is coupled to a LAN CN20 via the communication device 23. The storage apparatus 20 is able to carry out two-way communications with the management server 40 via the LAN CN20.

The CPU 22 executes a tier management function P20 and a logical volume provision function P21, which are stored in the primary storage device 24. These functions will be described in detail further below.

The secondary storage device 25 comprises multiple disk devices 250A, 250B and 250C as storage devices. The respective disk devices 250A, 250B and 250C are hierarchized in accordance with their response performance. Response performance is the data write speed and read speed.

For example, an upper-level disk tier 251A is configured from SSD 250A, which is a secondary storage device having high-speed response performance. A mid-level disk tier 251B is configured from a low-cost SAS disk 250B, which has lower response performance than the SSD 250A. A lower-level disk tier 251C is configured from a SATA disk 250C, which is the least expensive and has the lowest response performance.

In a case where no particular distinction is made, the disk devices 250A, 250B and 250C will be called the disk device 250. Furthermore, the recording medium of the disk device 250 does not have to be a disk; the shape of the recording medium does not matter. In a case where no particular distinction is made, the disk tiers 251A, 251B and 251C will be called the disk tier 251.

The logical volume provision function P21 consolidates the physical storage capacity possessed by a group of disk devices, and provides a volume pool 200, which is a virtual storage capacity resource. The logical volume provision function P21 creates a logical volume 210, which is a logical disk device, by partitioning the physical storage capacity resource possessed by the volume pool 200 into prescribed sizes. A created logical volume is allocated to the host 10 via the communication port 21. That is, the volume pool 200 is a RAID group (a parity group), which is configured from the respective disk devices 250.

The host 10 writes data, which must be made permanent as described hereinabove, to the logical volume 210, and reads this data as needed. The logical volume 210 is configured from multiple pages 211. A page 211 is a virtual storage area.

The logical volume provision function P21 writes write-data received from the host 10 to a prescribed page of the multiple pages 211 in accordance with a data write request to the logical volume 210. A page corresponding to the write-destination address included in the write command (write request) becomes the prescribed page.

The logical volume provision function P21 reads specified data from the prescribed page 211 and returns this data to the host 10, which is the request source, in accordance with a data read request with respect to the logical volume 210. The prescribed page is the page corresponding to the read-destination address included in the read command (read request).

The logical volume provision function P21 updates a read/write log D20 at the point in time at which the read request and write request are processed. The read/write log D20, for example, can comprise information for identifying a request-target page, information for distinguishing between a read request and a write request, information denoting whether or not a request can be processed correctly, and information denoting the time at which the request was received.

The page 211 is a logical storage area provided inside the logical volume 210, and a physical storage area for actually storing data exists inside the physical disk device 250, which belongs to any of the respective disk tiers 251A, 251B and 251C. That is, in a case where either a data write operation or a read operation has been carried out with respect to the page 211, the page 211 logically appears to be holding the data. However, the data is actually stored in a physical disk device 250 that belongs to any of the disk tiers 251A, 251B, 251C.

The tier management function P20 allocates the page 211 to any one disk tier from among the disk tiers 251A, 251B and 251C. The data, which is held by the page 211 logically, is physically stored in the disk device 250 that belongs to the disk tier 251 to which the tier management function P20 allocated this page.

The tier management function P20 measures the number of reads and the number of writes (hereinafter, the I/O load) with respect to each page 211. The tier management function P20 regularly reallocates each page 211 to any of the disk tiers 251A, 251B, 251C in accordance with this I/O load. Changing the data storage destination of the page 211 between the tiers like this is called page reallocation.

The tier management function P20 reallocates a high I/O load page 211 from among the respective pages 211 in the logical volume 210 to disk tier 251A. The tier management function P20 reallocates a page 211 having a medium I/O load to disk tier 251B, and reallocates a low I/O load page 211 to disk tier 251C.

Figure 5:
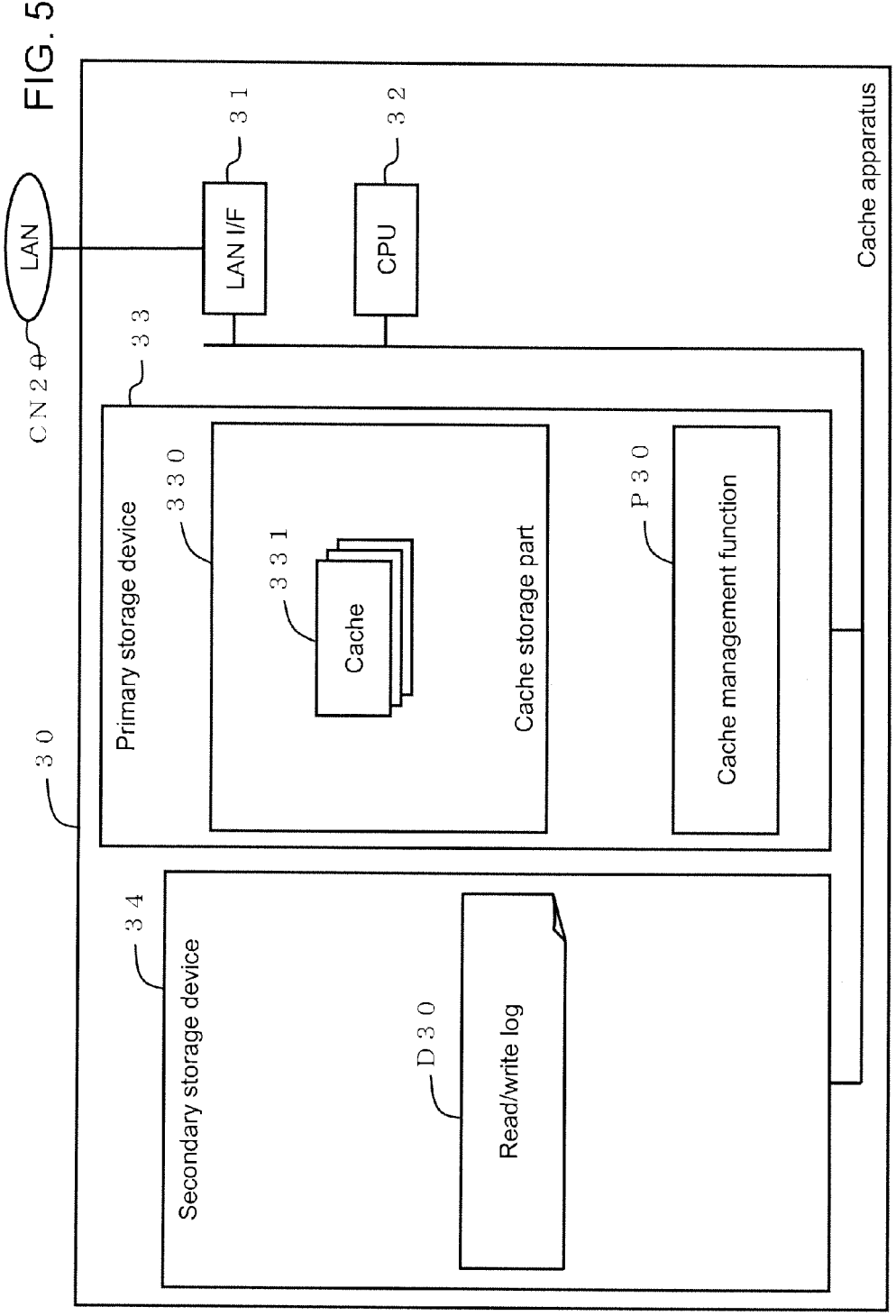
FIG. 5 shows the configuration of a cache apparatus.

FIG. 5 is a diagram showing the detailed configuration of the cache apparatus 30. The cache apparatus 30, for example, comprises a communication device 31, a CPU 32, a primary storage device 33, and a secondary storage device 34.

The cache apparatus 30 is coupled to a LAN CN20 via the communication device 31, and carries out two-way communications with the host computer 10 and the management server 40 in accordance with this.

The CPU 32 executes a cache management function P30 stored in the primary storage device 33. The cache apparatus 30 comprises a cache storage part 330 in the primary storage device 33. The cache storage part 330 stores data 331 received from the host 10. A data read and write can be carried out faster with respect to the cache data 331 in the cache storage part 330 than for the disk device 250.

The cache management function P30 creates the cache data 331 in accordance with a write request from the host 10, and stores this data 331 in the cache storage part 330. The cache management function P30 sends the cache data 331 to the host 10 in accordance with a read request from the host 10.

The cache management function P30 updates a read/write log D30 at the point in time at which either a write request or a read request is processed. The read/write log D30, for example, can comprise information for identifying the request-target cache data 331, information for distinguishing between a read request and a write request, information denoting whether or not a request can be processed correctly, and information denoting the time at which the request was received.

The host 10 writes the same content data to both the cache apparatus 30 and the logical volume 210. The cache apparatus 30 holds cache data 331 of the same content as the data written to a certain page 211 in the logical volume 210.

Ordinarily, since the size of the cache data 331 is smaller than the size of the page 211, in a case where all of the data held in a single page 211 is to be held in the cache apparatus 30, this cache-target data is stored in the cache storage part 330 as multiple pieces of cache data 331. However, there is no need to hold all of the data of a page 211 in the cache apparatus 30. Only the data that is required from among the data in the page 211 need be held in the cache apparatus 30.

The cache management function P30 manages the cache data 331 stored in the cache storage part 330. For example, the cache management function P30 compares the total capacity of the cache storage part 330 with the total capacity of the respective cache data 331 currently being stored, and computes the free capacity of the cache storage part 330. The cache management function P30, in accordance with a prescribed trigger, deletes cache data 331 that meets a prescribed condition. The regular or irregular deletion of cache data 331 is called a cache out.

As the prescribed trigger, for example, either a case in which there was a request to create a new cache, or a case in which a prescribed time configured by the system administrator has passed can be cited. Examples of prescribed conditions include a case where the free capacity of the cache storage part 330 has dropped down to a prescribed value, a case where the utilized capacity of the cache storage part 330 has reached a prescribed threshold, or a case where cache data, which has not been accessed for equal to or longer than a fixed period of time has been discovered.

The application program 11 on the host 10 writes prescribed data that must be read at high speed to both the storage apparatus 20 and the cache apparatus 30. The application program 11 reads the prescribed data from the cache apparatus 30 until the above-described cache out occurs. The application program 11 does not use the logical volume 210 in the storage apparatus 20. Therefore, a read request for a page 211 comprising the prescribed data does not occur until a cache out has been performed.

For this reason, the tier management function P20 of the storage apparatus 20 only measures the number of write requests with respect to the page 211 comprising the prescribed data as the I/O load. Therefore, the I/O load of the prescribed page is measured lower than a case in which the cache apparatus 30 was not used.

There is a high likelihood that the I/O load of the page 211 comprising the prescribed data will be a lower value than the I/O load for a page 211 comprising ordinary data that has not been stored in the cache apparatus 30. Therefore, the tier management function P20 allocates the page 211 comprising the prescribed data to the lower-performance lower-level disk tier in accordance with the I/O load that was measured too low.

In a case where a cache out occurs in a state in which the page 211 comprising the prescribed data has been allocated to the lower-level disk tier, the application program 11 must read the prescribed data from the lower-level disk tier. Since it takes a long time to read the prescribed data, the execution performance of the application program 11 deteriorates.

In addition, in a case where the application program 11 updates the prescribed data, the application program 11 must access the low-performance lower-level disk tier to update the prescribed data. Since the time required to update the prescribed data increases, the execution performance of the application program 11 deteriorates.

Since the application program 11 frequently references the prescribed data, the execution performance of the application program 11 frequently deteriorates. Frequent performance deterioration like this causes a drop in response performance with respect to the user of the application program 11.

For example, in a case where the application program 11 is an online shopping application, a drop in service response performance will lead to lost opportunities for a transaction. For the party operating the application program 11, prolonged service response times that lead to lost opportunities are not desirable. Consequently, in this embodiment, correctly measuring the I/O load of the prescribed data stored in the cache apparatus 30 as well controls the allocation destination of the page 211 comprising the prescribed data to the appropriate disk tier.

Figure 6:
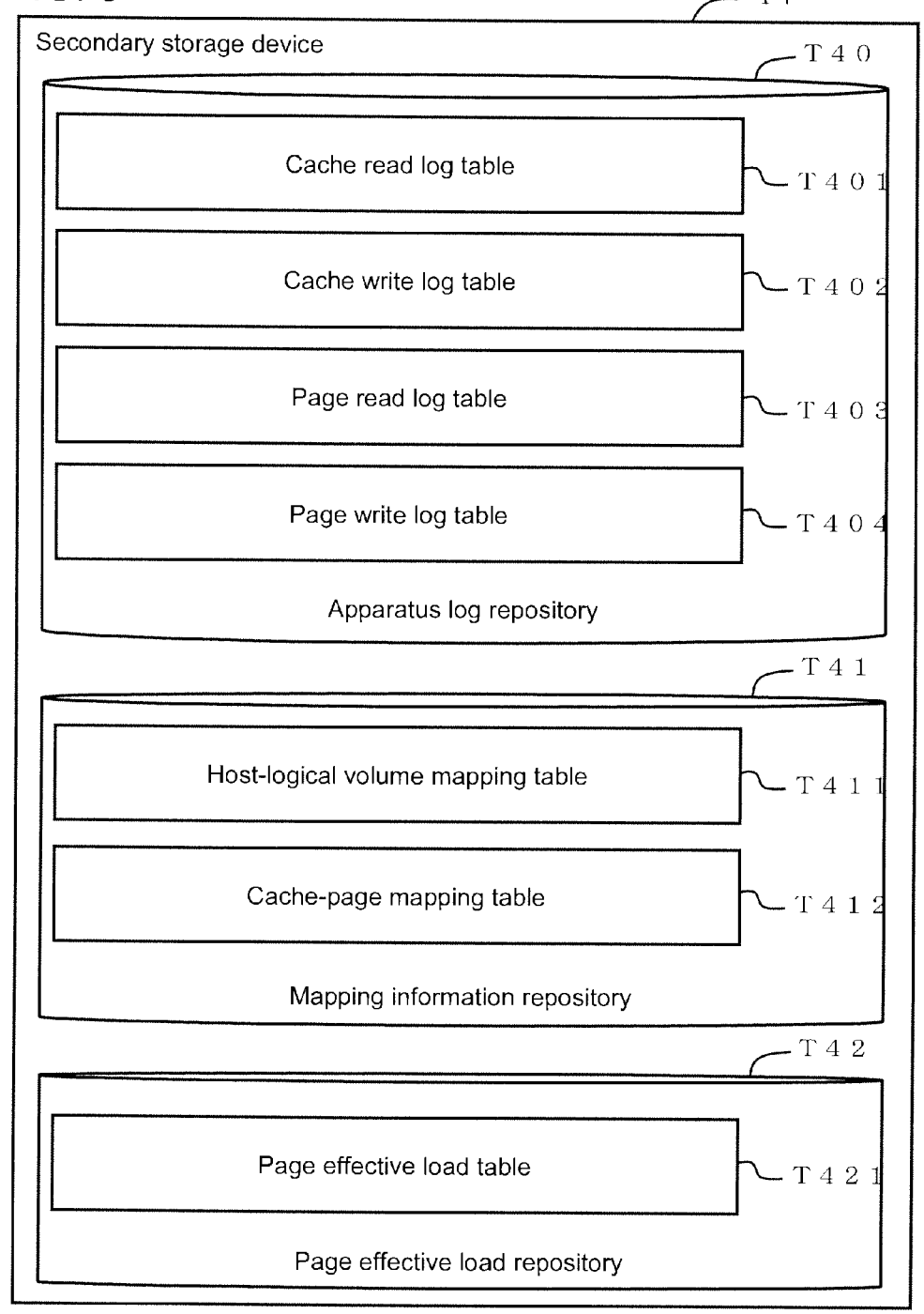
FIG. 6 shows the configuration of repositories and tables used by the management server.

FIG. 6 shows the table configurations of the apparatus log repository T40, the mapping information repository T41, and the page effective load repository T42 stored in the management server 40.

The apparatus log repository T40, for example, stores a cache read log table T401, a cache write log table T402, a page read log table T403, and a page write log table T404. Each table will be explained in detail further below.

The mapping information repository T41, for example, stores a host-logical volume mapping table T411, and a cache-page mapping table T412. Each table will be explained in detail further below.

The page effective load repository T42 stores a page effective load table T421. The page effective load table T421 will be explained in detail further below.

FIG. 7 is a diagram showing the column configuration of the cache read log table T401. The cache read log table T401, for example, comprises a host name column C4010, a cache ID column C4011, and a read time column C4012.

Information for identifying each host 10 is stored in the host name column C4010. Information for identifying the cache data 331 read by the host 10 is stored in the cache ID column C4011. The cache ID is created as uniquely-stipulated information at the least inside the computer system. The cache ID, for example, can be created using technology such as GUID (Globally Unique Identifier). Also, a hash value obtained from the cache data 331 may be used as the cache ID.

A date and time at which the host 10 read the cache data 331 is stored in the read time column C4012. Referring to a record of the cache read log table T401 makes it possible to check which host 10 read which cache data 331 inside the cache apparatus 30 and at what time.

FIG. 8 is a diagram showing the column configuration of the cache write log table T402. The cache write log table T402, for example, comprises a host name column C4020, a cache ID column C4021, and a write time column C4022. The host name column C4020 stores information for identifying a host 10. The cache ID column C4021 stores information for identifying cache data 331 written by the host 10. The write time column C4022 stores the date and time at which the cache data 331 was written by the host 10. Referring to a record of the cache write log table T402 makes it possible to check which host wrote what cache data 331 in the cache apparatus 30 and at what time.

FIG. 9 shows the column configuration of the page read log table T403. The page read log table T403, for example, comprises a page ID column C4030 and a read time column C4031. The page ID column C4030 stores information for identifying a page 211. The read time column C4031 stores the date and time at which the page 211 was read. Referring to a record of the page read log table T403 makes it possible to check which page 211 in the storage apparatus 20 was read and at what time.

FIG. 10 is a diagram showing the column configuration of the page write log table T404. The page write log table T404, for example, comprises a logical volume ID column C4040, a page ID column C4041, and a write time column C4042. The logical volume ID column 4040 stores information for identifying a logical volume 210. Logical volume is abbreviated as volume in the drawing. The page ID column C4041 stores information for identifying a page 211 in the logical volume 210. The write time column C4042 stores the date and time at which data was written to the page 211. Referring to a record of the page write log table T404 makes it possible to check to which page 211 inside which logical volume 210 data was written and at what time.

FIG. 11 is a diagram showing the column configuration of the host-logical volume mapping table T411. The host-logical volume mapping table T411, for example, comprises a host name column C4110, and a logical volume ID column C4111. The host name column C4110 stores information for identifying a host 10. The logical volume ID column C4111 stores information for identifying the logical volume 210 that is being used by the host 10. Referring to a record of the host-logical volume mapping table T411 makes it possible to check which host 10 is using which logical volume 210.

FIG. 12 is a diagram showing the column configuration of the cache-page mapping table T412. The cache-page mapping table T412, for example, comprises a cache ID column C4120, and a page ID column C4121. The cache ID column C4120 stores information for identifying cache data 331. The page ID column C4121 stores information for identifying a page 211. Referring to the cache-page mapping table T412 makes it possible to check the page 211 in the storage apparatus 20 in which data of the same content as the cache data 331 in the cache apparatus 30 is stored. That is, the table T412 manages the corresponding relationship between the cache data 331 and the page 211.

FIG. 13 is a diagram showing the column configuration of the page effective load table T421. The page effective load table T421, for example, comprises a page ID column C4210, and an effective total number of I/Os column C4211. The page ID column C4210 stores information for identifying a page 211. The effective total number of I/Os column C4211 stores the number of times the page 211 has actually been accessed (the sum of the number of reads and the number of writes).

Referring to a record of the page effective load table T421 makes it possible to check the effective total number of I/Os, which is a value obtained by adding the number of I/Os with respect to the page 211 to the number of I/Os with respect to the cache data 331, which holds data of the same content as this page 211. That is, the table T421 manages the total number of I/Os of a page, taking into account the number of times the cache data 331 has been read from the cache apparatus 30.

Figure 14:
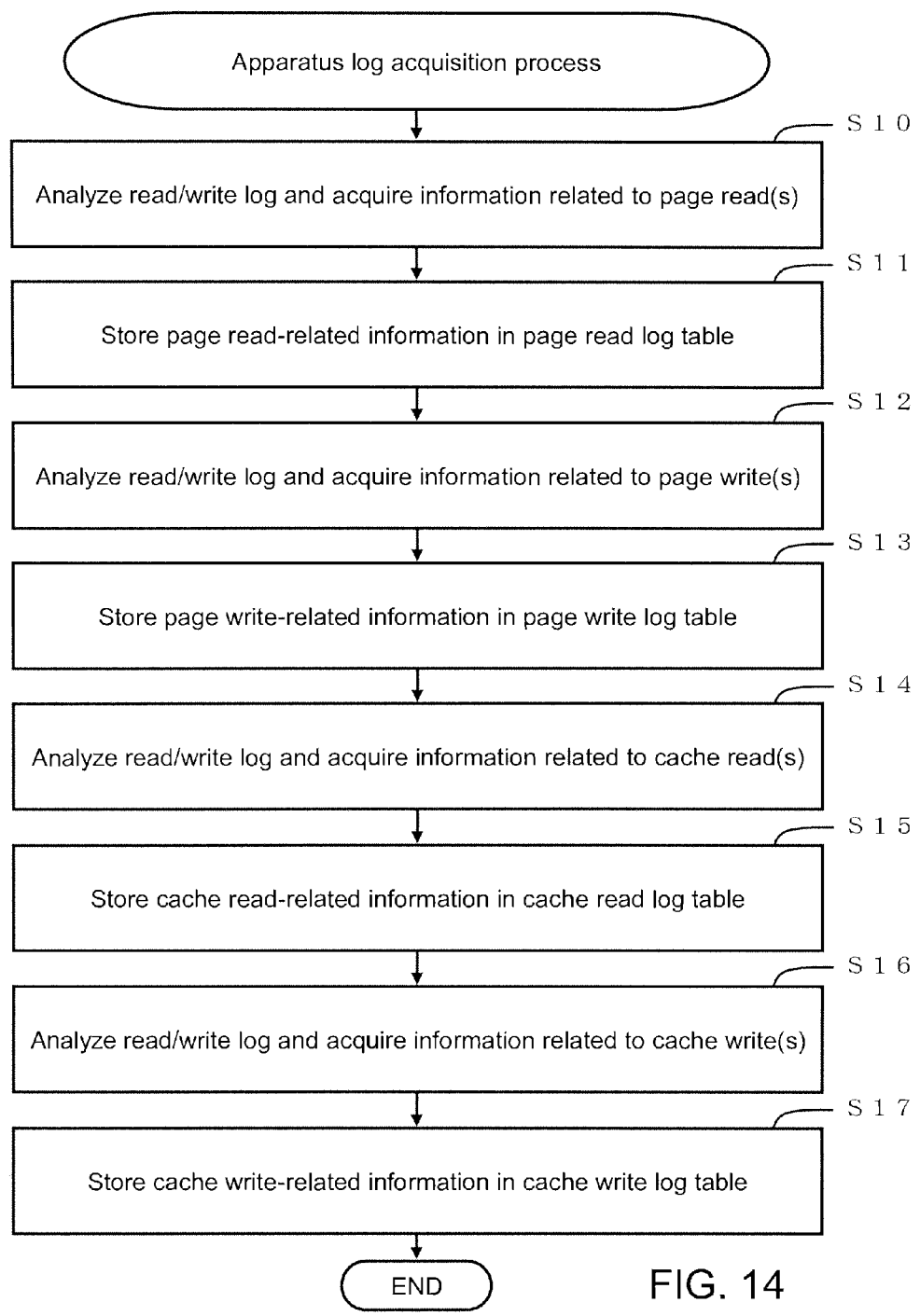
FIG. 14 is a flowchart showing processing for acquiring an apparatus log.

FIG. 14 is a flowchart showing the processing steps in accordance with the apparatus log acquisition part P40 of the management server 40. Hereinafter, a step may be abbreviated as "S".

The order of the time sequence relationship of the combinations S10 and S11, S12 and S13, S14 and S15, and S16 and S17 can be rearranged. For example, the combination of S16 and S17 may be executed first, the combination of S14 and S15 may be executed next, the combination of S12 and S13 may be executed next, and the combination of S10 and S11 may be executed last.

The apparatus log acquisition part P40 acquires information required for the management server 40 to optimize the utilization status of the disk device group inside the storage apparatus 20 from the storage apparatus 20 and the cache storage part 330. That is, the apparatus log acquisition part P40 collects information necessary for issuing an appropriate instruction for page reallocation from the management server 40 to the storage apparatus 20. The processing steps of the apparatus log acquisition part P40 shown in FIG. 14 may be executed regularly, or an execution instruction may be received at an arbitrary trigger specified by the user.

The apparatus log acquisition part P40 analyzes the read/write log D20 inside the storage apparatus 20, and acquires information related to a read request of each page 211 (S10). Next, the apparatus log acquisition part P40 stores the information acquired in S10 in the page read log table T403 (S11).

The apparatus log acquisition part P40 analyzes the read/write log D20 inside the storage apparatus 20, and acquires information with respect to a write request of each page 211 (S12). Next, the apparatus log acquisition part P40 stores the information acquired in S12 in the page write log table T404 (S13).

The apparatus log acquisition part P40 analyzes the read/write log D30 inside the cache storage part 330, and acquires information related to a cache data 331 read request (S14). Next, the apparatus log acquisition part P40 stores the information acquired in S14 in the cache read log table T401 (S15).

The apparatus log acquisition part P40 analyzes the read/write log D30 inside the cache storage part 330, and acquires information related to a cache data 331 write request (S16). Next, the apparatus log acquisition part P40 stores the information acquired in S16 in the cache write log table T402 (S17).

In this example, the apparatus log acquisition part P40 acquires required information from the log D20 and the log D30 to be outputted by the storage apparatus 20 and the cache apparatus 30. Instead of this, the configuration may be such that dedicated software for sending information to the management server 40 is provided in the storage apparatus 20 and the cache apparatus 30. These dedicated software programs automatically acquire and send to the management server 40 information that is equivalent to the information held in the read/write log D20 and the read/write log D30.

Figure 15:
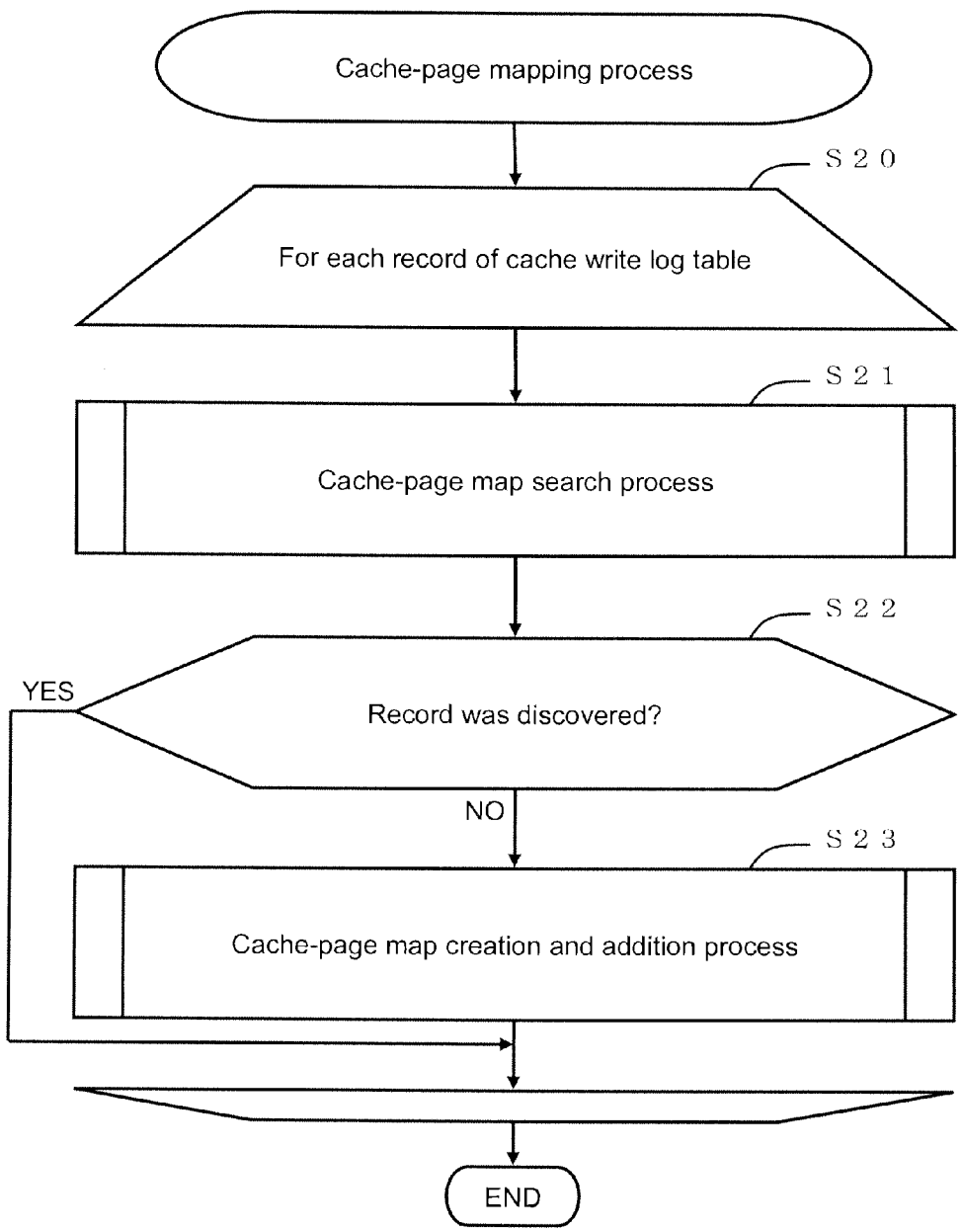
FIG. 15 is a flowchart showing processing for mapping the cache to a page.

FIG. 15 is a flowchart showing the processing steps of the cache-page mapping part P41 of the management server 40. The cache-page mapping part P41 identifies the page 211 inside the storage apparatus 20 in which the same data as the cache data 331 stored in the cache storage part 330 is being stored. The cache-page mapping process in accordance with the cache-page mapping part P41 is executed subsequent to the apparatus log acquisition process in accordance with the apparatus log acquisition part P40.

The cache-page mapping part P41 executes S21, S22 and S23 for each record of the cache write log table T402 (S20).

The cache-page mapping part P41 searches to determine whether the cache data 331 listed in a record of the cache write log table T402 is already mapped to any page 211 (S21). That is, the cache-page mapping part P41 uses the cache ID stored in column C4021 of the cache write log table T402 shown in FIG. 8 as a search key to search column C4120 of the cache-page mapping table T412 shown in FIG. 12.

The cache-page mapping part P41 determines whether or not a record related to the target cache data 331 exists in the cache-page mapping table T412 (S22). That is, the cache-page mapping part P41 determines whether or not cache data listed in a record of the cache write log table T402 (the target cache data) is registered in the cache-page mapping table T412.

In a case where the target cache data 331 is mapped to any of the pages 211 (S22: YES), this processing ends. Alternatively, in a case where the target cache data 331 is not mapped to any of the pages 211 (S22: NO), the cache-page mapping part P41 executes processing for creating and storing a new map between the cache data 331 and a page 211 (S23).

Figure 16:
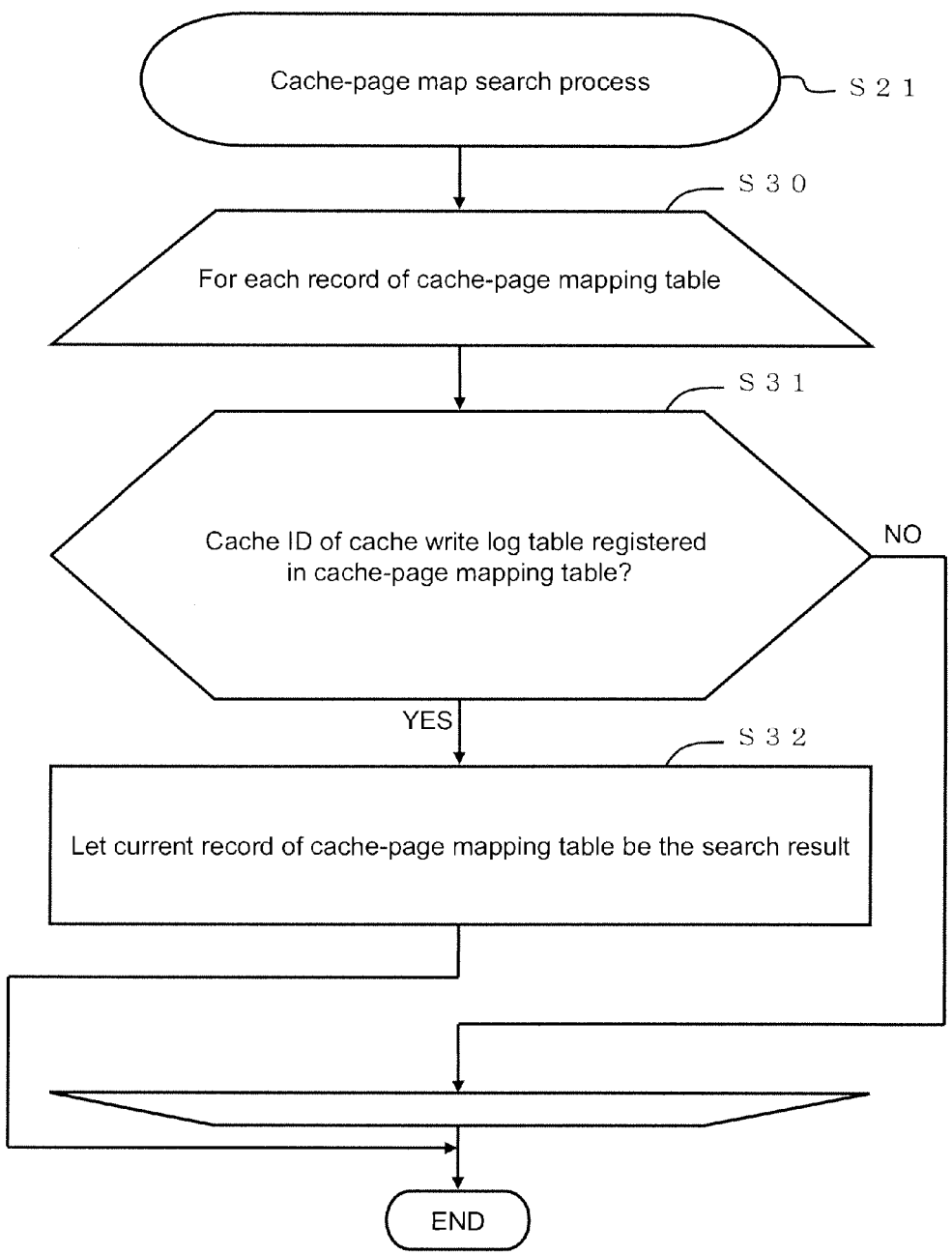
FIG. 16 is a flowchart showing the details of processing for searching for a cache-page map during the cache-page mapping process.

FIG. 16 is a flowchart showing the detailed processing steps of the cache-page map searching process shown in S21 of FIG. 15.

The cache-page mapping part P41 executes S31 and S32 with respect to each record of the cache-page mapping table T412 (S30).

The cache-page mapping part P41 determines whether or not the target cache data (the cache data registered in the cache write log table T402) is registered in the cache-page mapping table T412 (S31).

In a case where the target cache data is registered in the cache-page mapping table T412 (S31: YES), the record in which the target cache data is registered is returned to the processing of FIG. 15, which is the call source (S32).

In a case where the target cache data is not registered in the cache-page mapping table T412 (S31: NO), the cache-page mapping part P41 moves to the next record.

Figure 17:
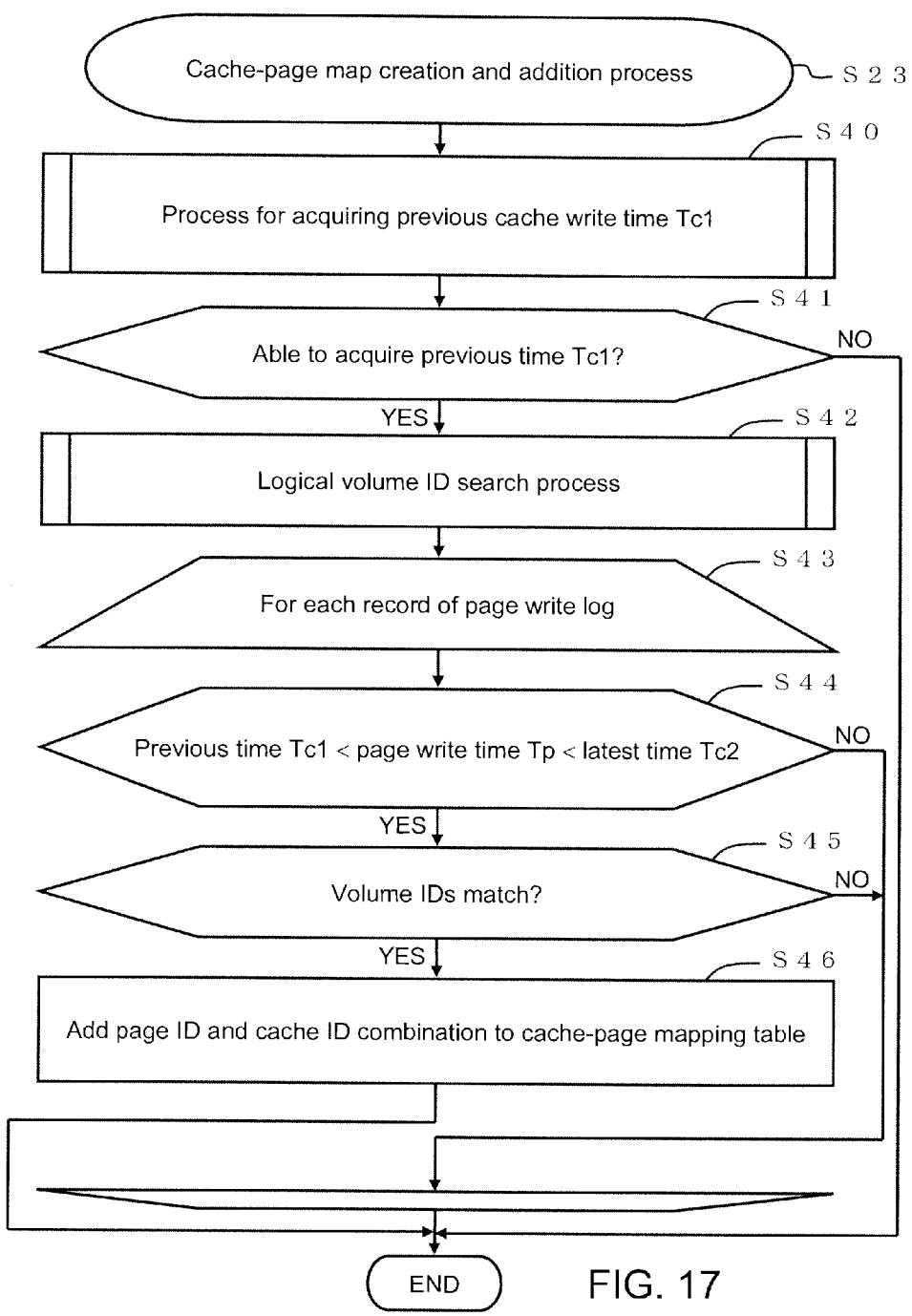
FIG. 17 is a flowchart showing the details of processing for either creating or adding a cache-page map during the cache-page mapping process.
Figure 18:
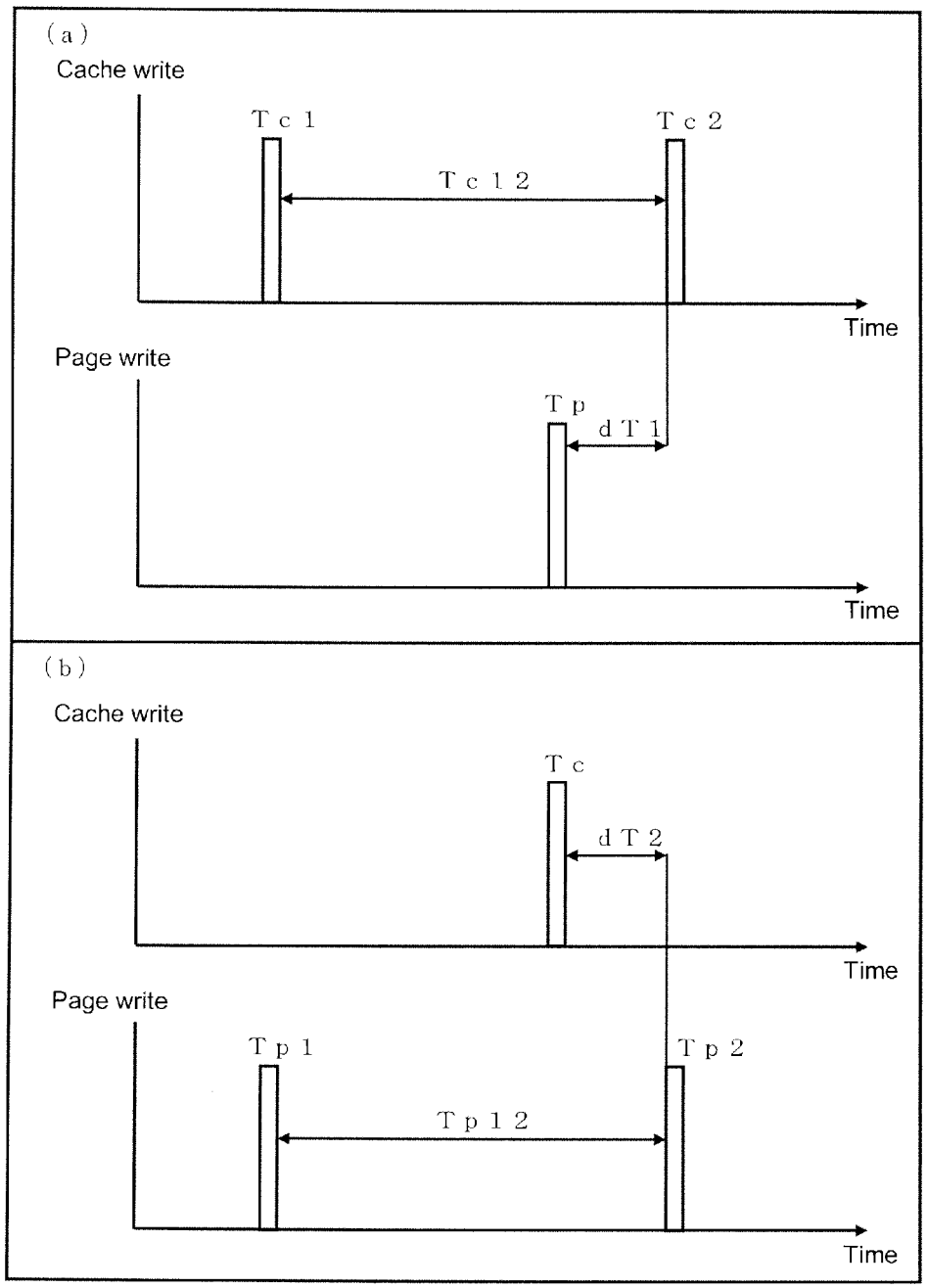
FIG. 18 is a schematic diagram showing the relationship between cache data update time and page update time, (a) showing a case in which the cache data is updated after updating a page, and (b) showing a case in which a page is updated after updating the cache data.

FIG. 17 is a flowchart showing the detailed processing steps of the cache-page map creation and addition process shown in S23 of FIG. 15.

The cache-page map creation and addition process creates a map showing the corresponding relationship between the cache data and the page. FIG. 18(a) will be referred to here. FIG. 18(a) shows a method for identifying the corresponding relationship between the cache data 331 and the page 211 based on the update times Tc1 and Tc2 of the cache data 331 and the page 211 update time Tp. FIG. 18(a) is premised on a case in which the application program 11 updates the data inside the page 211 first, and updates the cache data 331 next.

In this process, the latest write time Tc2 and the previous write time Tc1 are detected in relation to the processing-targeted cache data (target cache data). In addition, in this process, a page, which was updated within a prescribed time Tc12 between the latest write time Tc2 and the previous write time Tc1 of the target cache data, is detected, and the update time (write time) Tp of this page is detected. In this process, in a case where the host 10, which updated the target cache data, and the host 10, which updated the page, are ascertained to be the same, a new map, which associates the page that was updated within the prescribed time Tc12 with the target cache data, is created, and this map is stored in the cache-page mapping table T412.

The application program 11 may rapidly update the cache data 331 after updating the data of the page 211 first.

This is because, when updating the cache data 331, practically all application programs 11 carry out substantially simultaneous writes to both the cache and the page in order to guarantee the integrity of the data. Furthermore, generally speaking, the application program 11 may first write to the page 211, and subsequent thereto, write to the cache data 331 the same content as the content that was written to the page 211.

Therefore, the time difference dT1 between the page 211 write time Tp and the write time Tc2 of the cache data 331 corresponding to this page 211 may be relatively short. However, this time difference dT1, for example, may undergo various fluctuations due to factors such as the states of the communication networks CN10 and CN20, the load status of the host 10, and the load statuses of the storage apparatus 20 and the cache apparatus 30, and may not be constant.

Consequently, in this example, the prescribed time Tc12 from the latest cache write time Tc2 to the previous cache write time Tc1 is used as a period for searching for the corresponding relationship. In this example, the page 211, which was updated within the prescribed time Tc12 and was configured by the same host 10 as the update source of the cache data 331, is determined to be the page that corresponds to the target cache data 331.

Return to FIG. 17. The cache-page mapping part P41 acquires the previous write time Tc1 with respect to the target cache data 331 (S40). The cache-page mapping part P41 determines whether or not it was possible to acquire a write time Tc1 of prior to the latest write time Tc2 with respect to the target cache data 331 (S41).

In a case where it was not possible to acquire the previous write time Tc1 of the target cache data 331 (S41: NO), this processing ends. For example, in a case where data has been written to the cache apparatus 30 for the first time, a previous write will not exist. Furthermore, in a case where the previous write time Tc1 was a long time ago, there is also the likelihood that this write log has disappeared from the log D30. In this case as well, it is not possible to acquire the previous write time Tc1.

In a case where it was possible to acquire the previous write time Tc1 of the target cache data 331 (S41: YES), the cache-page mapping part P41 searches for the ID of the logical volume being used by the host 10 that wrote to the target cache data 331 (S42).

The cache-page mapping part P41 respectively executes S44, S45, and S46 for each record of the page write log table T404.

The cache-page mapping part P41 determines whether or not the write time Tp of the page 211 falls within the prescribed time Tc12 from the latest write time Tc2 to the previous write time Tc1 of the target cache data 331 (S44).

In a case where the page 211 write time Tp does not fall within the prescribed time Tc12 (S44: NO), the cache-page mapping part P41 moves to the next record. In a case where the page 211 write time Tp falls within the prescribed time Tc12 (S44: YES), the cache-page mapping part P41 determines whether or not the ID of the logical volume to which the page 211 belongs matches the volume ID retrieved in S42 (S45).

In S45, a determination is made as to whether or not the logical volume used by the host 10 that updated the target cache data 331 is the same as the logical volume to which the page 211 updated by the host 10 belongs. That is, the cache-page mapping part P41 determines whether or not the host 10, which is the write source of the target cache data 331, and the host 10, which is the write source of the page 211, are the same.

In a case where the ID of the logical volume being used by the host 10 that updated the target cache data 331 does not match the ID of the logical volume to which the page 211 updated by the host 10 belongs (S45: NO), the cache-page mapping part P41 moves to the next record.

In a case where the ID of the logical volume being used by the host 10 that updated the target cache data 331 matches the ID of the logical volume to which the page 211 updated by the host 10 belongs (S45: YES), the cache-page mapping part P41 adds a new record to the cache-page mapping table T412 (S46).

The cache-page mapping part P41 registers the combination of the target cache data 331 and the page 211, which was updated by the same host 10 as that of the target cache data 331, in the cache-page mapping table T412.

In a case where the page 211 and the cache data 331 have been updated within the prescribed time Tc12 by the same host 10, it is possible to associate the page 211 with the cache data 331 on the basis of the update time.

Furthermore, as shown in FIG. 18(b), a case in which the application program 11 updates the cache data 331 first, and updates the data inside the page 211 next is also conceivable. In this case, the method for associating the page 211 with the cache data 331 will be described in an example that will be explained further below.

Figure 19:
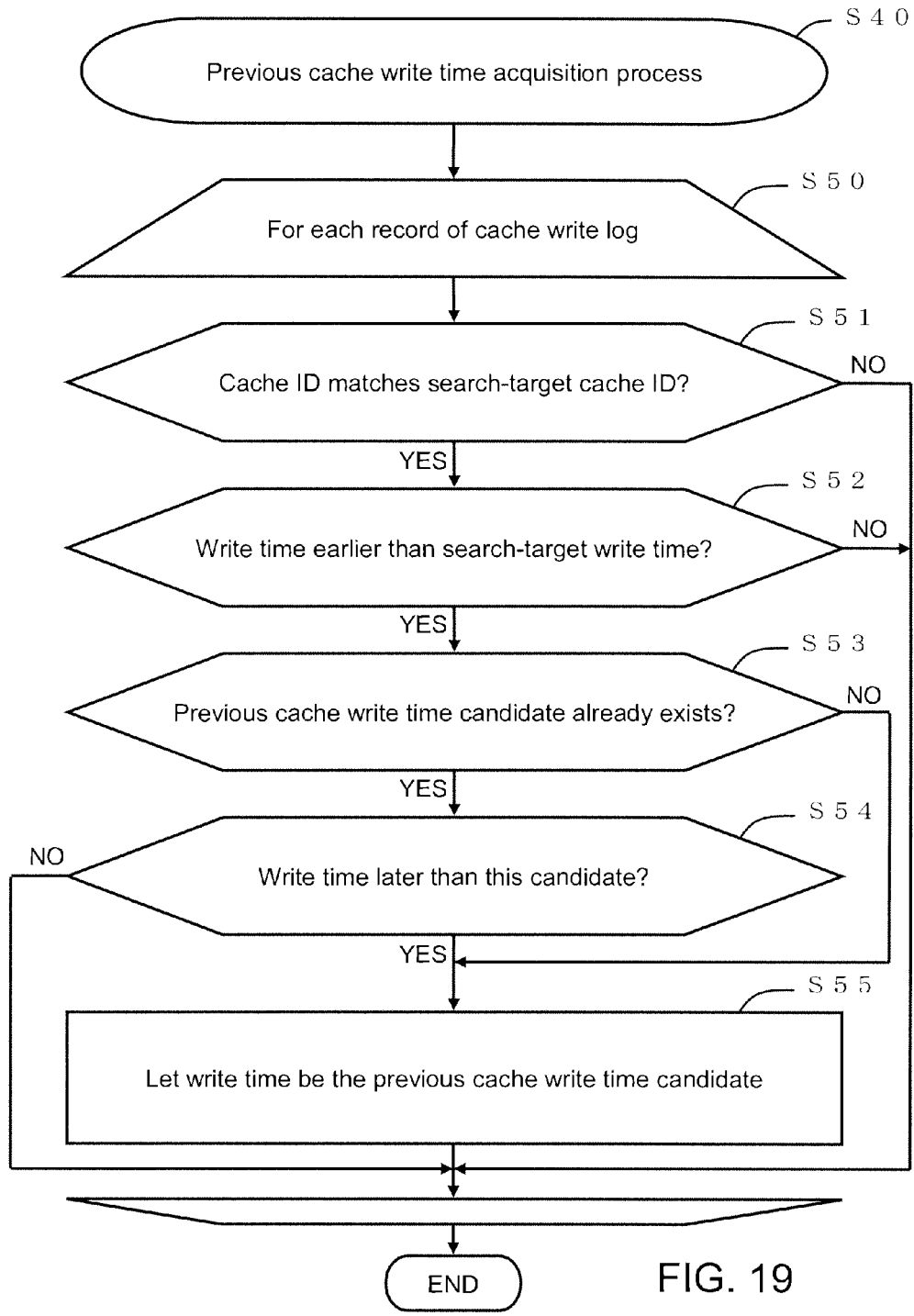
FIG. 19 is a flowchart showing the details of processing for acquiring the previous cache write time during the cache-page mapping process.

FIG. 19 is a flowchart of the process for acquiring the previous cache write time shown in S40 of FIG. 17. The cache-page mapping part P41 executes S51, S52, S53, S54, and S55 for each record of the cache write log table T402. Hereinafter, the record that constitutes the processing target (the record of the cache write log table T402) will be called the target record.

The cache-page mapping part P41 determines whether or not the cache ID of the search-target cache data 331 is the same as the cache ID registered in the target record (S51). In a case where the cache ID of the search-target cache data 331 does not match the cache ID in the target record (S51: NO), the cache-page mapping part P41 moves to the next record.

In a case where the cache ID of the search-target cache data 331 matches the cache ID in the target record (S51: YES), the cache-page mapping part P41 determines whether or not the target record write time is earlier than the write time of the search-target cache data 331 (S52).

In a case where the target record write time does not occur earlier than the write time (Tc2) of the search-target cache data 331 (S52: NO), the cache-page mapping part P41 moves to the next record.

In a case where the target record write time occurs earlier than the write time (Tc2) of the search-target cache data 331 (S52: YES), the cache-page mapping part P41 determines whether or not one or more previous cache write time candidates have already been discovered (S53). In a case where no candidate has been found yet (S53: NO), the cache-page mapping part P41 skips S54, moves to S55, and stores the write time in the target record as a candidate for the previous cache write time.

In a case where a candidate for the previous cache write time has been discovered (S53: YES), the cache-page mapping part P41 determines whether or not the write time in the target record is later than the previously discovered write time (S54). That is, in this example, in a case where multiple previous cache write times are detected, the newer write time is used.

In a case where the determination is that the write time in the target record is later than the previously discovered write time (S54: YES), the cache-page mapping part P41 stores the write time in the target record as a candidate for the previous cache write time (S55).

In a case where the write time in the target record is not later than the previously discovered write time (S54: NO), the cache-page mapping part P41 skips S55 and moves to the next record.

When all of the records of the cache write log table T402 have been processed, this processing ends, and the cache-page mapping part P41 returns to the processing of FIG. 17.

Figure 20:
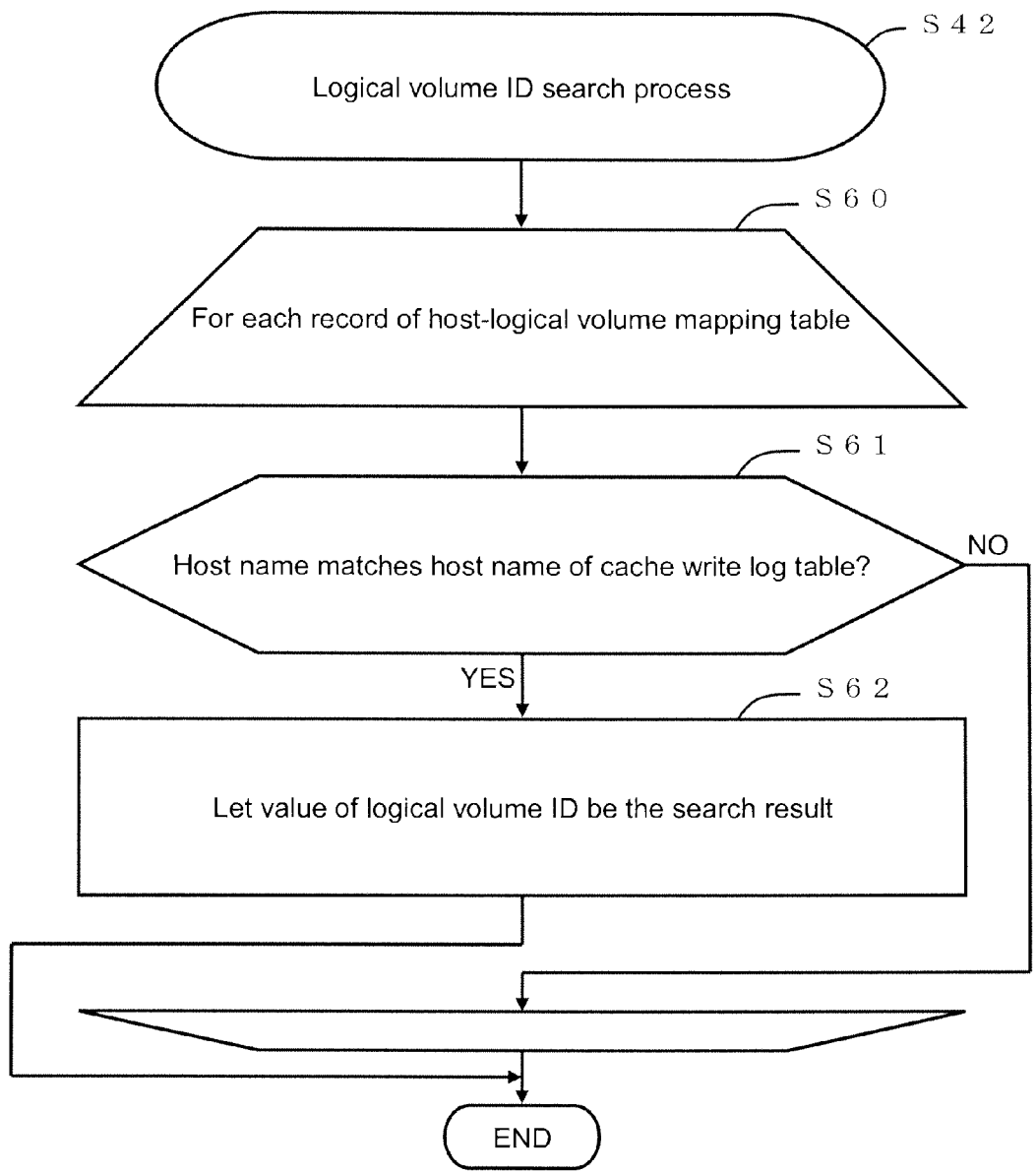
FIG. 20 is a flowchart showing the details of processing for acquiring a logical volume ID during the cache-page mapping process.

FIG. 20 is a flowchart of a logical volume ID search process shown as S42 in FIG. 17. The cache-page mapping part P41 executes S61 and S62 for each record of the host-logical volume mapping table T411 (S60). The processing-targeted record of the respective records in the host-logical volume mapping table T411 will be called the target record.

The cache-page mapping part P41 determines whether or not the host name (C4110) of the target record matches the host name corresponding to the target cache data (S61). The host name corresponding to the target cache data is the host name listed in the record corresponding to the target cache data from among the host names listed in the host name column C4020 of the cache write log table T402.

In a case where the two host names do not match (S61: NO), the cache-page mapping part P41 moves to the next record. Alternatively, when the two host name match (S61: YES), the cache-page mapping part P41 lets the value of the logical volume ID in the target record be the search result (S62), and returns to the processing of FIG. 17.

Figure 21:
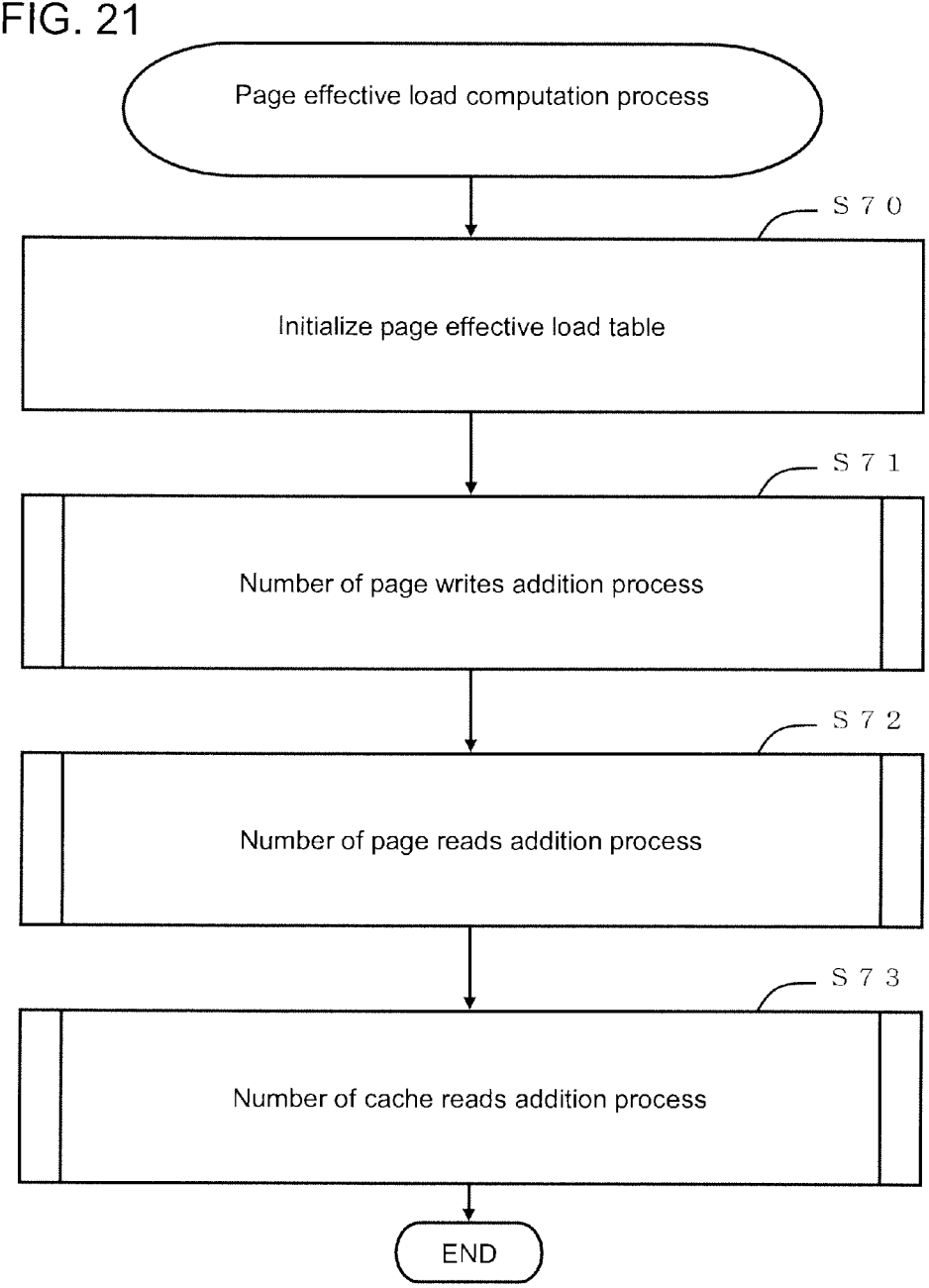
FIG. 21 is a flowchart of processing for computing a page effective load.

FIG. 21 is a flowchart showing the processing steps of the page effective load computation part P42 of the management server 40. The respective steps S71, S72, and S73 do not necessarily have to be executed in this order.

The page effective load computation process is executed after the cache-page mapping process (FIG. 15). The page effective load computation part P42 computes the effective load to be used as the criteria for page reallocation with respect to each page from information acquired by the apparatus log acquisition part P40 and a map created by the cache-page mapping part P41.

The page effective load computation part P42 initializes the content of the page effective load table T421 using the previous page reallocation (S70).

The page effective load computation part P42 executes a process for adding the number of writes to a page 211 (S71). In the process for adding the number of page writes, the number of write requests to each page 211 in the storage apparatus 20 that occurred from the previous page reallocation time to the present time are totaled and stored in the page effective load table T421. As used here, the page reallocation time signifies the time at which the page reallocation instruction process was previously executed.

The page effective load computation part P42 totals the number of read requests that have occurred from the previous page reallocation time to the present time with respect to each page 211 in the storage apparatus 20, and updates the page effective load table T421 (S72).

The page effective load computation part P42 totals the number of read requests that have occurred from the previous page reallocation time to the present time with respect to each piece of cache data 331 in the cache apparatus 30 corresponding to the page, and updates in the page effective load table T421 (S73).

Figure 22:
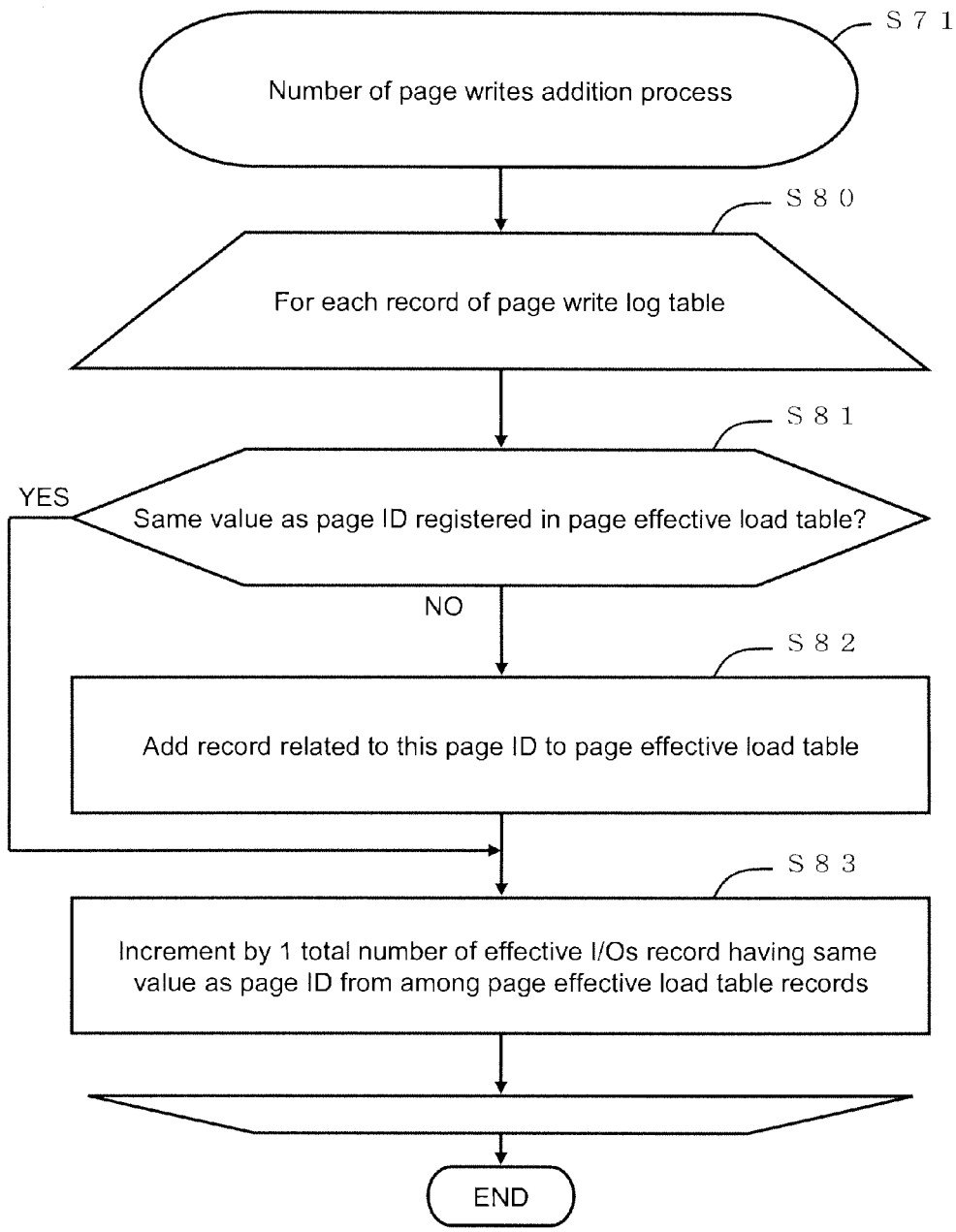
FIG. 22 is a flowchart showing the details of processing for adding a number of page writes during the page effective load computation process.

FIG. 22 is a flowchart of a number of page writes addition process shown in S71 of FIG. 21.

The page effective load computation part P42 executes S81, S82, and S83 for each record of the page write log table T404 (S80). The processing-targeted record of the respective records of the page write log table T404 will be called the target record.

The page effective load computation part P42 determines whether or not the page ID included in the target record is already registered in the page effective load table T421 (S81).

In a case where the page ID in the target record is not registered in the page effective load table T421 (S81: NO), the page effective load computation part P42 creates a new record comprising a page ID in the target record, and adds this new record to the page effective load table T421 (S82). Furthermore, 0 is configured in the initial value of the effective total number of I/Os (C4211) in the target record.

In a case where the page ID in the target record is registered in the page effective load table T421 (S81: YES), the page effective load computation part P42 skips S82.

The page effective load computation part P42 increments by 1 the value of the effective total number of I/Os in the page effective load table T421 record, which comprises the same page ID as the page ID in the target record (S83).

In this example, as has been described hereinabove, the records of the page effective load table T421 are added consecutively. Instead of this, a new record may be added to the table T421 subsequent to the effective total number of I/Os having been updated with respect to all the records in the page effective load table T421.

Figure 23:
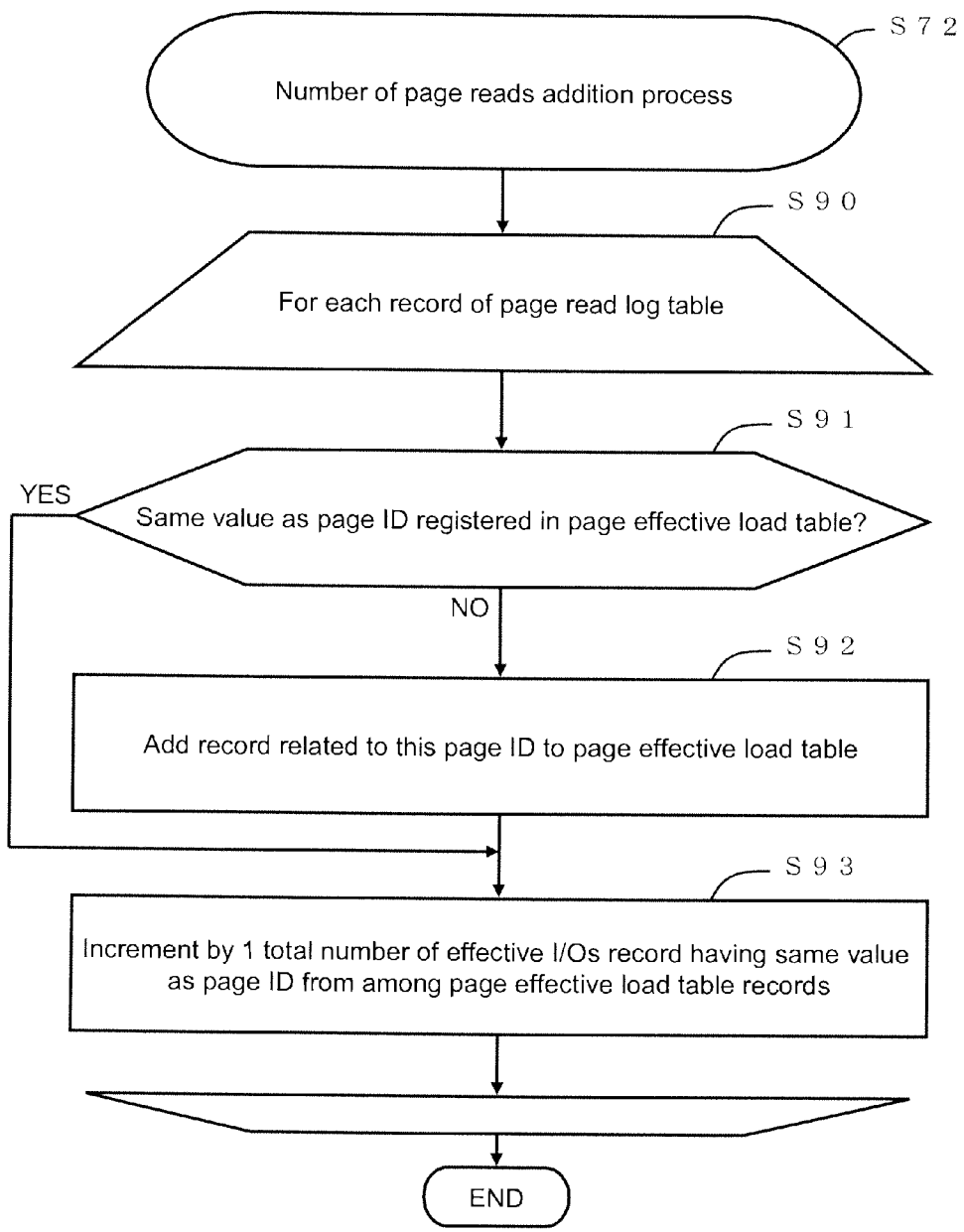
FIG. 23 is a flowchart showing the details of processing for adding a number of page reads during the page effective load computation process.

FIG. 23 is a flowchart of a number of page reads addition process S72 shown in S72 of FIG. 21.

The page effective load computation part P42 executes S91, S92 and S93 for each record of the page read log table T403 (S90). Hereinafter, the processing-targeted record of the respective records of the table T403 will be called the target record.

The page effective load computation part P42 determines whether or not the page ID included in the target record is already registered in the page effective load table T421 (S91).

In a case where the page ID in the target record is not registered in the page effective load table T421 (S91: NO), the page effective load computation part P42 creates a new record comprising a page ID in the target record, and adds this new record to the page effective load table T421 (S92). Furthermore, 0 is configured in the initial value of the effective total number of I/Os (C4211) in the target record.

In a case where the page ID in the target record is registered in the page effective load table T421 (S91: YES), the page effective load computation part P42 skips S92.

The page effective load computation part P42 increments by 1 the value of the effective total number of I/Os in the page effective load table T421 record, which comprises the same page ID as the page ID in the target record (S93).

As has been described hereinabove, a new record may be added to the table T421 after the effective total number of I/Os has been updated with respect to all the records in the page effective load table T421.

Figure 24:
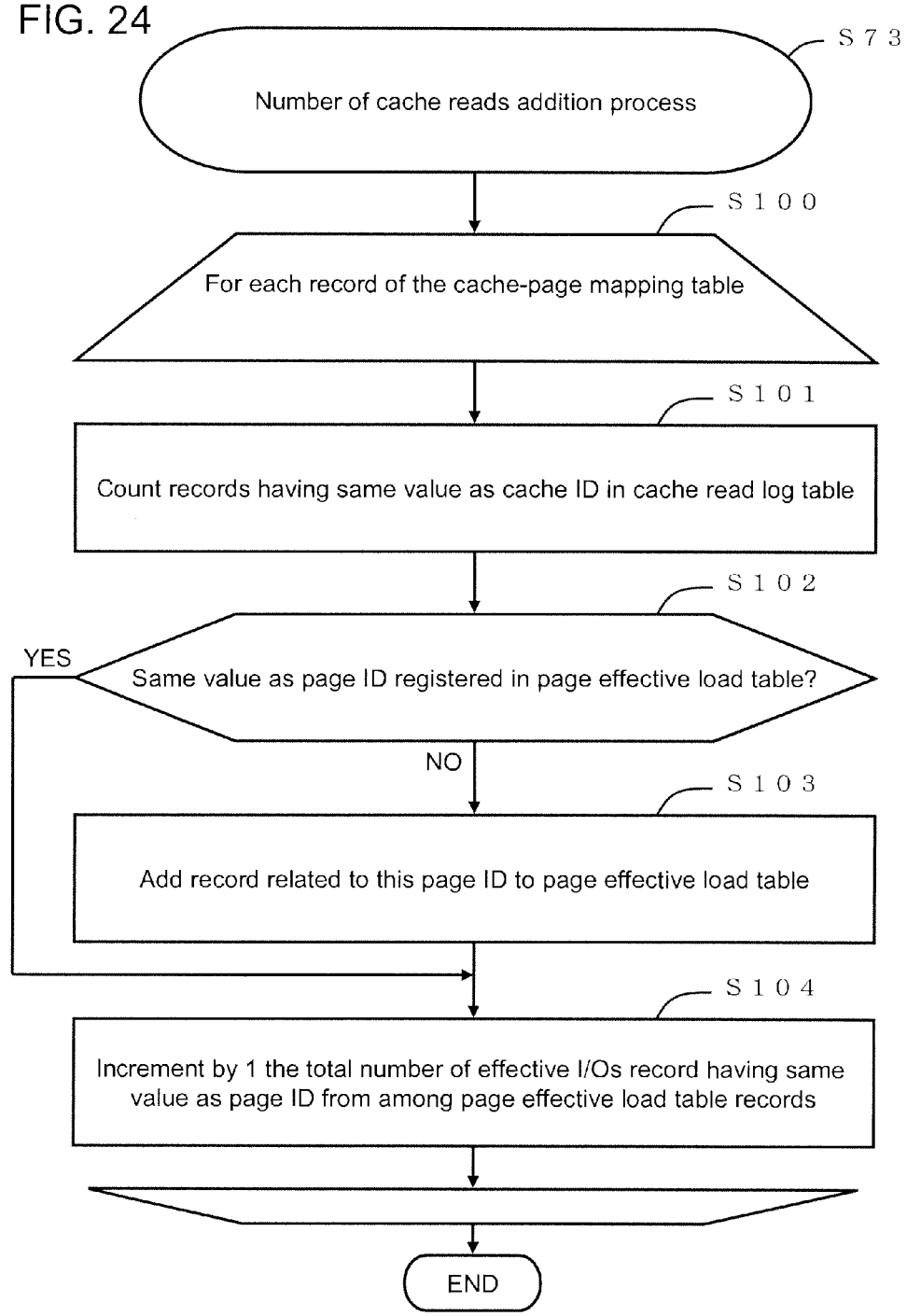
FIG. 24 is a flowchart showing the details of processing for adding a number of cache reads during the page effective load computation process.

FIG. 24 is a flowchart of a number of page writes addition process S73 shown in S73 of FIG. 21.

The page effective load computation part P42 executes S101, S102, S103, and S104, which will be described further below, for each record of the cache-page mapping table T412 (S100). Hereinafter, the processing-targeted record of the respective records of the cache-page mapping table T412 will be called the target record.

The page effective load computation part P42 computes the number of times that the cache data 331 identified by the cache ID of the target record has been read from the cache apparatus 30 (S101). The page effective load computation part P42 can compute the number of times that the cache data has been read by checking how many times the cache ID in the target record appears in the cache read log table T401.

The page effective load computation part P42 determines whether or not a record comprising the same page ID as the page ID in the target record already exists in the page effective load table T421 (S102).

In a case where a record comprising the same page ID as the page ID in the target record does not exist in the page effective load table T421 (S102: NO), the page effective load computation part P42 creates a new record and adds this new record to the table T421 (S103). The new record comprises the same page ID as the page ID in the target record. Zero (0) is configured as the initial value in the effective total number of I/Os column of the new record.

The page effective load computation part P42 adds the value computed in S101 to the value of the effective total number of I/Os C4211 for the page effective load table T421 record, which comprises the same page ID as the page ID in the target record (S104).

Similar to the above, a new record may be added to the table T421 after updating the effective total number of I/Os for all the records of the page effective load table T421.

Figure 25:
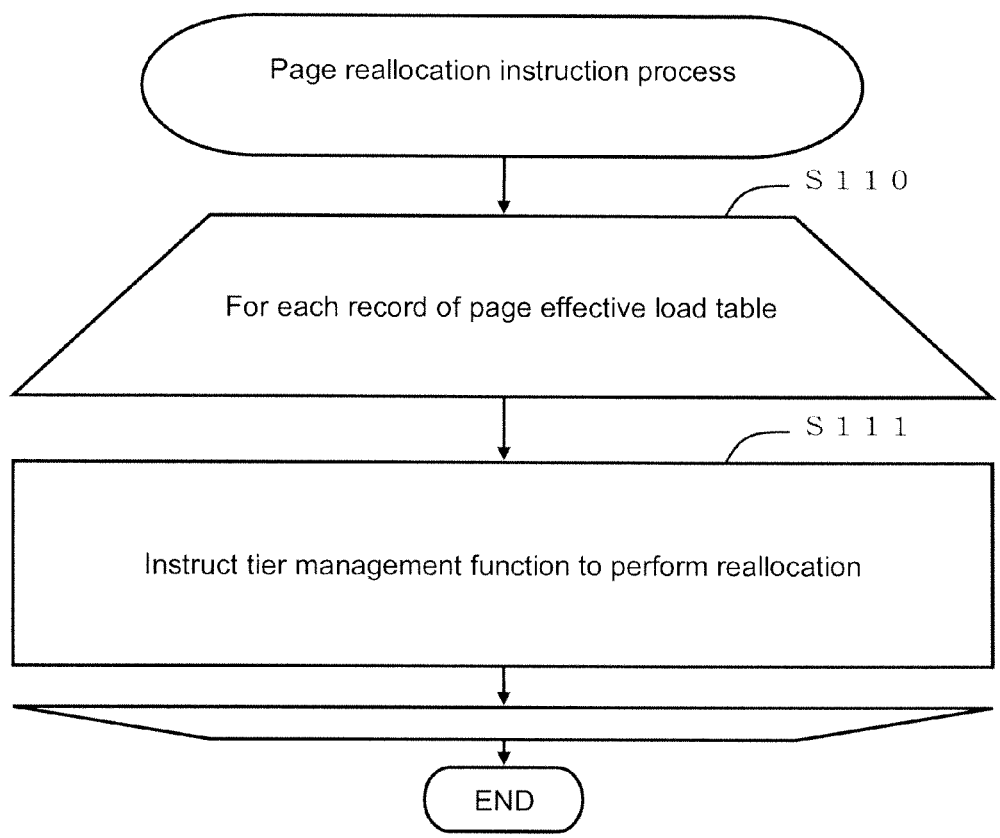
FIG. 25 is a flowchart showing the processing for issuing an instruction for reallocating a page.

FIG. 25 is a flowchart showing the processing steps of the page reallocation instruction part P43 of the management server 40.

The page reallocation instruction part P43 executes S111, which will be described further below, for each record of the page effective load table T421 (S110). The processing-targeted record of the respective records of the table T421 will be called the target record.

The page reallocation instruction part P43 instructs the tier management function P20 of the storage apparatus 20 to reallocate the page 211 shown in the target record based on the value of this effective total number of I/Os.

Figure 26:
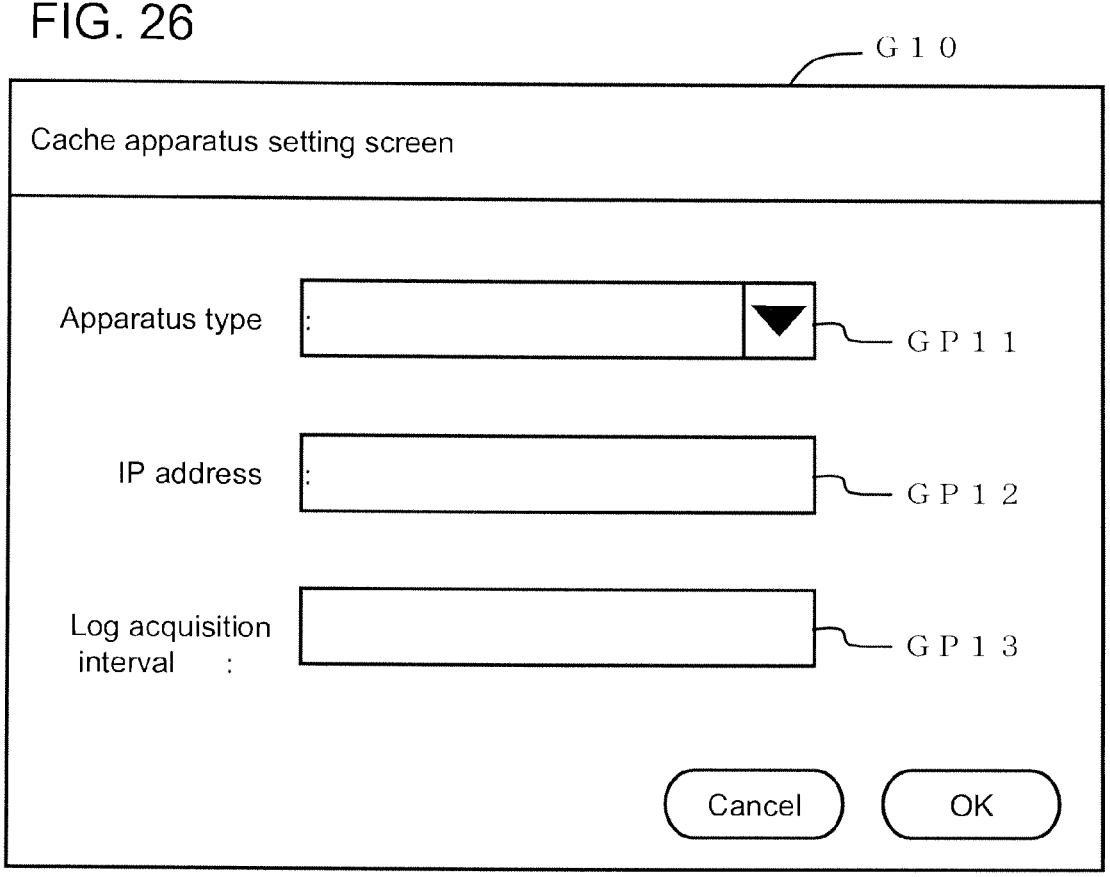
FIG. 26 shows a setting screen of the cache apparatus.

FIG. 26 is an example of a screen of the cache apparatus setting screen G10, which the management server 40 displays on the display 43. The setting screen G10 is for configuring information for managing the cache apparatus 30 with the management server 40. The cache apparatus setting screen G10, for example, comprises an apparatus type input field GP11, an IP address input field GP12, and a log acquisition interval input field GP13.

The apparatus type input field GP11 is for either inputting or selecting a type of cache apparatus 30 to be targeted for management by the management server 40. The IP address input field GP12 is for inputting the IP address of the cache apparatus 30. The log acquisition interval input field GP13 is for inputting the time interval at which the apparatus log acquisition process is to be executed. Furthermore, in a case where the cache apparatus type has been configured beforehand, the apparatus type input field GP11 can be done away with.

Figure 27:
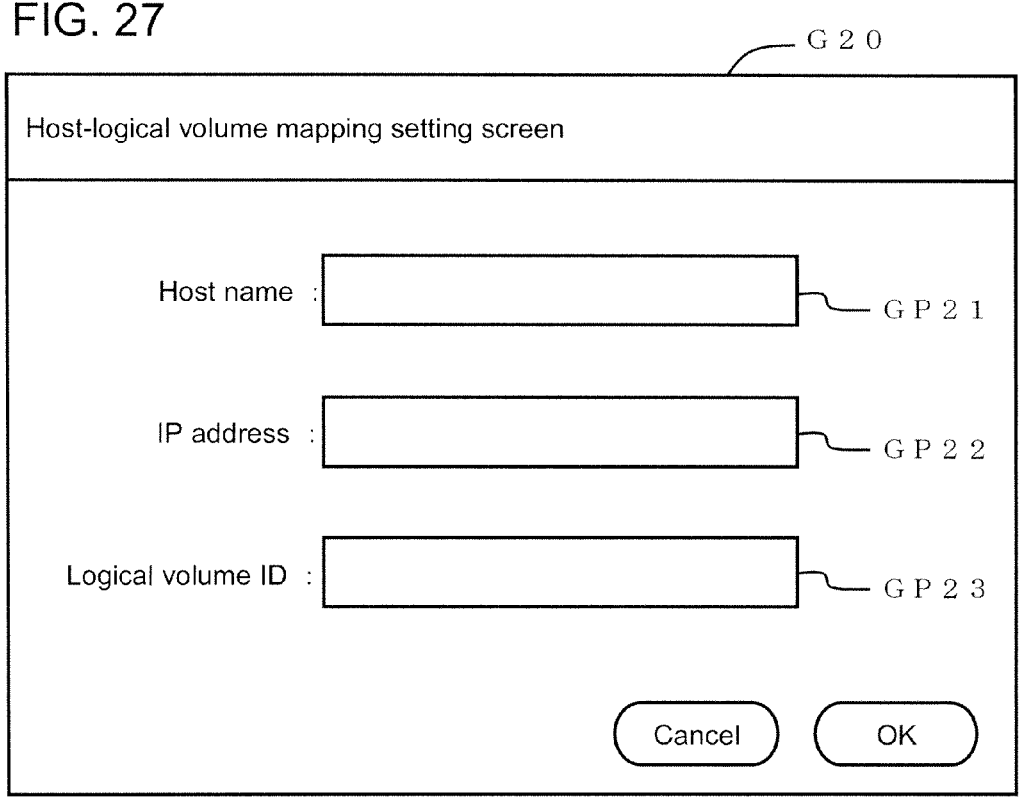
FIG. 27 shows a setting screen for mapping the host computer and the logical volume.

FIG. 27 is an example of a screen of the host-logical volume mapping setting screen G20, which the management server 40 displays on the display 43. The setting screen G20 is for configuring a logical volume 210 to be used by the host 10.

The host-logical volume mapping setting screen G20, for example, can comprise a host name input field GP21, an IP address input field GP22, and a logical volume ID input field GP23. The host name input field GP21 is for inputting a host name for identifying a host 10. The IP address input field GP22 is for inputting a host 10 IP address. The logical volume ID input field GP23 is for inputting the value of the volume ID of the logical volume to be used by the host 10.

This example, in accordance with being configured as described hereinabove, achieves the following effects. In this example, it is possible to correctly assess the utilization status of the data of a page 211 in a computer system in which the host 10 uses both a storage apparatus 20 and a cache apparatus 30.

In this example, it is possible to allocate a page comprising data to the proper disk tier 251 in accordance with the actual number of I/Os with respect to this data even in a case where this data is read from the cache apparatus 30.

Therefore, in this embodiment, the application program 11 is able to read targeted data relatively quickly from inside the storage apparatus 20 even in a case where the cache data 331 has been deleted from the cache apparatus 30. For this reason, it is possible to curb the deterioration of the processing performance of the application program 11 even in a case where the cache data 331 has been deleted from the cache apparatus 30.

In this example, the management server 40 acquires the data utilization status in the storage apparatus 20 (the I/O log D20) and the data utilization status in the cache apparatus 30 (the I/O log D30), and measures the actual utilization status of each page 211 (the effective total number of I/Os). Therefore, the storage apparatus 20 and the cache apparatus 30 do not need to be aware of one another, and the configurations thereof do not need to be changed very much.

SECOND EXAMPLE

A second example will be explained by referring to FIGS. 28 through 32. Each of the following examples, to include this example, is equivalent to a variation of the first example. Therefore, in each of the following examples, the explanations will focus on the difference(s) with the first example. In this example, the precision for determining the corresponding relationship between the page 211 and the cache data 331 is enhanced.

The cache-page mapping part P41 of the first example could make a mistake in determining the corresponding relationship between the cache data 331 and the page 211. The storage apparatus 20 and the cache apparatus 30 belong to different communication networks, i.e., a SAN CN10 and a LAN CN20. Therefore, for example, there could be a case in which the page write time Tp and the cache data write time Tc fluctuate in accordance with the load statuses of the respective communication networks, indicating results that are the opposite of the original sequential relationship. As a result, despite the fact that the cache data 331 has been updated subsequent to updating the page 211, there is the possibility of the cache data 331 update being recorded in the log as having been carried out before the page update.

Consequently, in this example, the corresponding relationship between the cache data 331 inside the cache apparatus 30 and the page 211 inside the storage apparatus 20 is inferred based on past statistical information. In accordance with this, the affects of fluctuations resulting from communication delays are held in check and the accuracy of inferring the corresponding relationship is heightened in this example.

Figure 28:
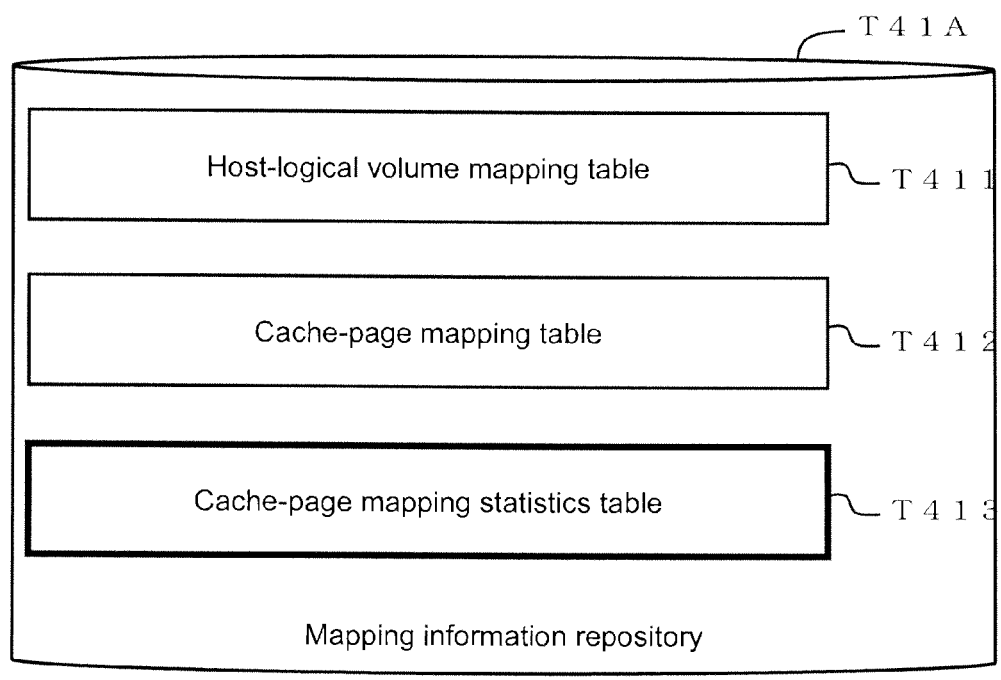
FIG. 28 is an illustration showing the configuration of a mapping information repository related to a second example.

FIG. 28 is a block diagram of a mapping information repository T41A. The mapping information repository T41A of this example comprises a cache-page mapping statistics table T413 in addition to the configuration of the mapping information repository T41 described in the first example. The cache-page mapping statistics table T413, which will be explained further below, stores the results of all past inferences of the corresponding relationship between the page 211 and the cache data 331. The cache-page mapping statistics table T413 is used as a determination criteria for inferring a corresponding relationship.

FIG. 29 shows the configuration of the cache-page mapping statistics table T413. The cache-page mapping statistics table T413, as was explained hereinabove, manages statistical data with respect to the corresponding relationship between the cache data 331 and the page 211.

The cache-page mapping statistics table T413, for example, comprises a cache ID column C4130, a page ID column C4131, and a number of mappings column C4132. The cache ID column C4130 stores a cache ID for identifying the cache data 331. The page ID column C4131 stores a page ID for identifying the page 211. The number of mappings column C4132 stores the number of times determinations have been made with respect to the cache data 331 identified using the column C4130 and the page 211 identified using the column C4131. Furthermore, the value of the number of mappings, for example, may be reset when the power to the management server 40 is turned ON, or may be stored without being reset.

Figure 30:
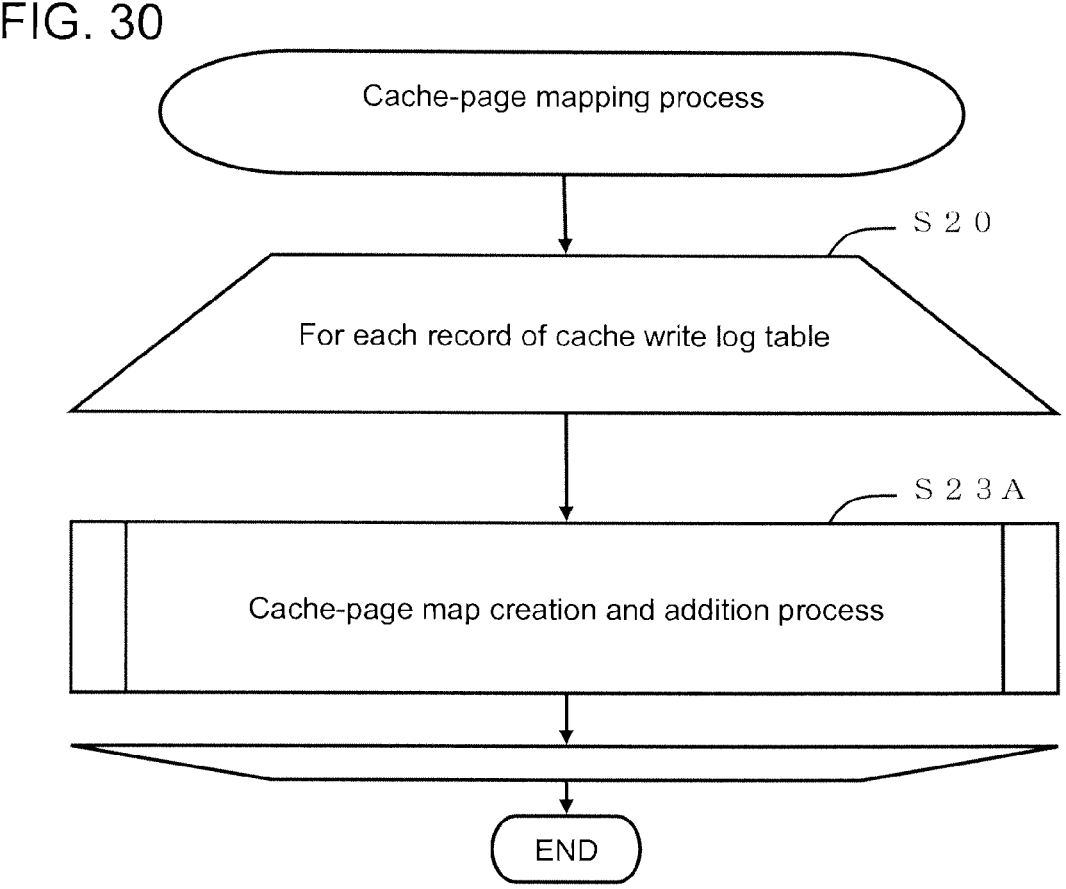
FIG. 30 is a flowchart of the cache-page mapping process.

FIG. 30 is a flowchart of the cache-page mapping process of this example. This process does away with S21 and S22 of the process shown in FIG. 15. In this example, since all of the determination results for the corresponding relationship between the cache data and the page are recorded as statistical information in the table T413, there is no need to eliminate duplicate corresponding relationships as in the first example. Therefore, S21 and S22 have been removed in FIG. 30. Furthermore, since the cache-page mapping creation and addition process is improved compared to the first example, a reference sign S23A is assigned to the improved process.

Figure 31:
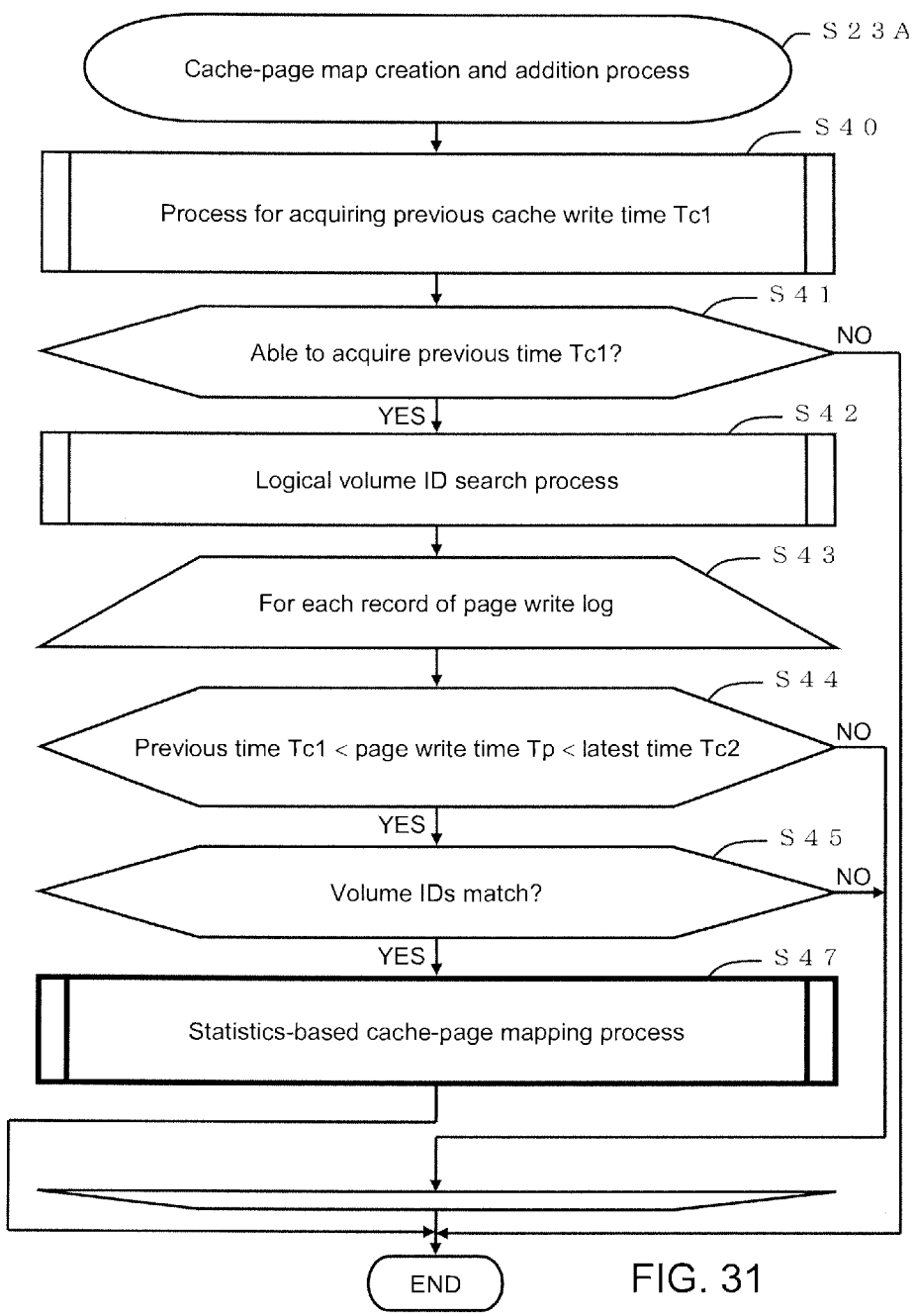
FIG. 31 is a flowchart of the process for either creating or adding a cache-page map during the cache-page mapping process.

FIG. 31 is a flowchart of the cache-page mapping creation and addition process S23A according to this example. This flowchart differs from the flowchart shown in FIG. 17 in that S46 has been replaced by S47. In S47, a current page-cache map is inferred based on the statistics of a past inference result (determination result).

Figure 32:
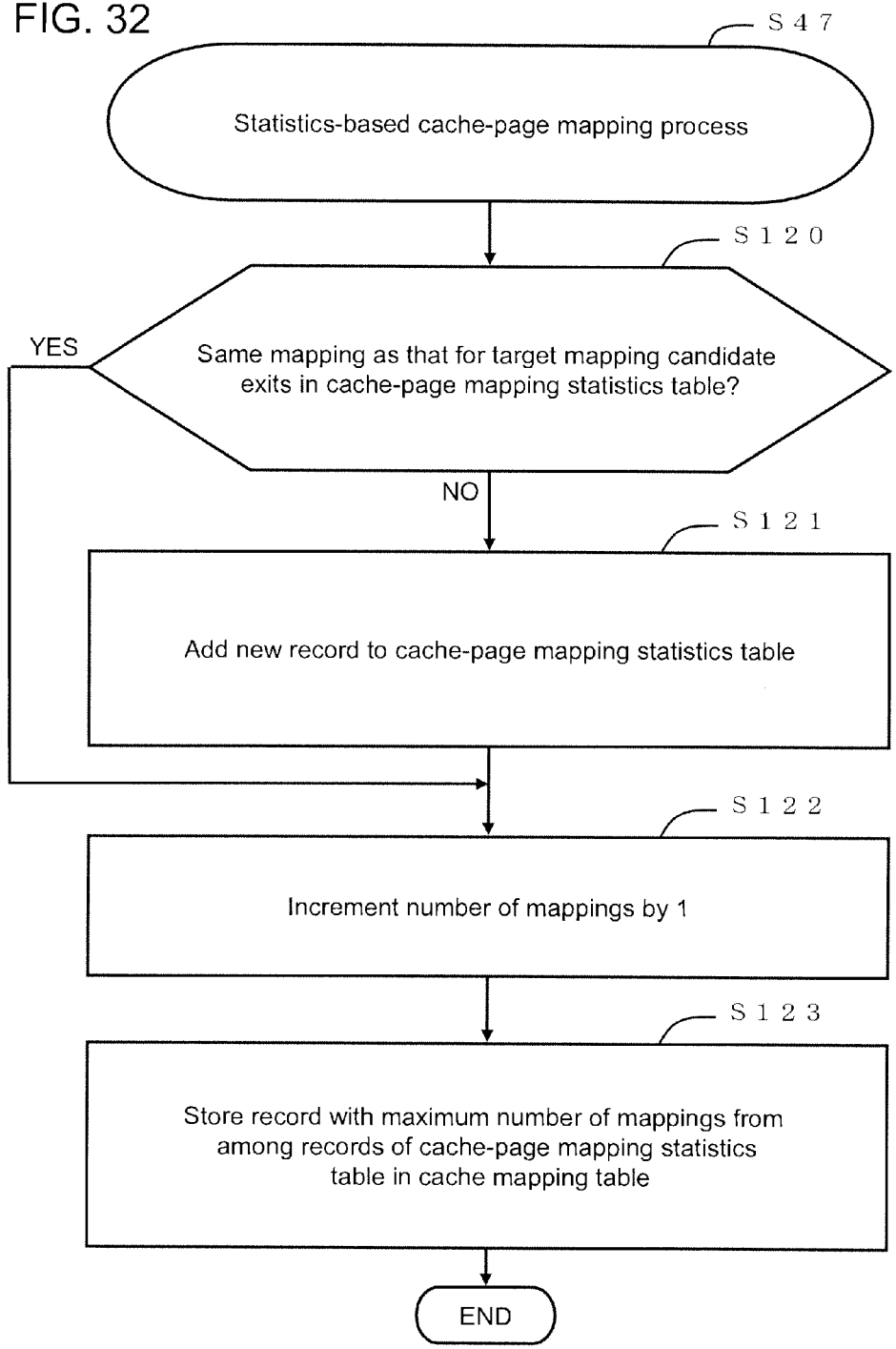
FIG. 32 is a flowchart of a statistics-based page-cache mapping process during the cache-page mapping process.

FIG. 32 is a flowchart of the statistics-based page-cache mapping process S47 shown in S47 of FIG. 31. A map candidate showing the corresponding relationship between the page and the cache data is determined in accordance with S40 through S45 of FIG. 31.

The cache-page mapping part P41 determines whether or not this inferred map candidate (target map candidate) is included in the cache-page mapping statistics table T413 (S120).

In a case where the target map candidate is not included in the cache-page mapping statistics table T413 (S120: NO), the cache-page mapping part P41 creates a new record, and adds this new record to the cache-page mapping statistics table T413 (S121). The cache ID and the page ID related to the target map candidate are included in the new record. As the initial value, 0 is configured in the number of mappings column C4132 of the new record.

The cache-page mapping part P41 adds 1 to the value of the number of mappings column C4132 with respect to the record related to the target map candidate of the cache-page mapping statistics table T413 (S122). In a case where the target map candidate is registered in the cache-page mapping statistics table T413 (S120: YES), S121 is skipped and the cache-page mapping part P41 moves to S122.

The cache-page mapping part P41 refers to the cache-page mapping statistics table T413, and detects the page with the highest number of mappings from among the pages 211 associated with the cache ID of the target map candidate (S123). The cache-page mapping part P41 registers the record of the page with the highest number of mappings in the cache-page mapping table T412 (S123).

That is, the cache-page mapping part P41 detects the record in which the value of the number of mappings column C4132 is the highest from among the records comprising the same cache ID as the cache ID of the target map candidate in the cache-page mapping statistics table T413. Then, the cache-page mapping part P41 stores the record comprising the highest number of mappings for the prescribed cache ID in the cache-page mapping table T412 as the determination result.

In this example, as described hereinabove, it is possible to determine the corresponding relationship between the cache data 331 and the page 211 based on a past determination result. Therefore, in this example, the corresponding relationship between the cache data 331 and the page 211 can be determined more accurately, making it possible as a result to allocate the page 211 to a more appropriate disk tier.

THIRD EXAMPLE

A third example will be explained by referring to FIG. 33. In this example, a method for associating the cache data with the page in a case where the application program 11 updates the cache data 331 first, and subsequently updates the data of the page 211, will be explained. In this example, the explanation is premised on the first example, but this example can also be combined with the second example instead.

As shown in FIG. 18(b), in a case where data is updated in this example, the application program 11 updates the cache data 331 at time Tc, and thereafter updates the data of the page 211 at time Tp2. The time delay from the cache data 331 write to the page 211 write will be expressed as dT2.

The cache-page mapping part P41 regards a prescribed time Tp12 from the latest page write time Tp2 to the previous page write time Tp1 as the search time. The cache-page mapping part P41, in a case where there was a cache data 331 write in accordance with the same host as the host that updated the page 211 within the search time Tp12, associates this cache data 331 and page 211.

Figure 33:
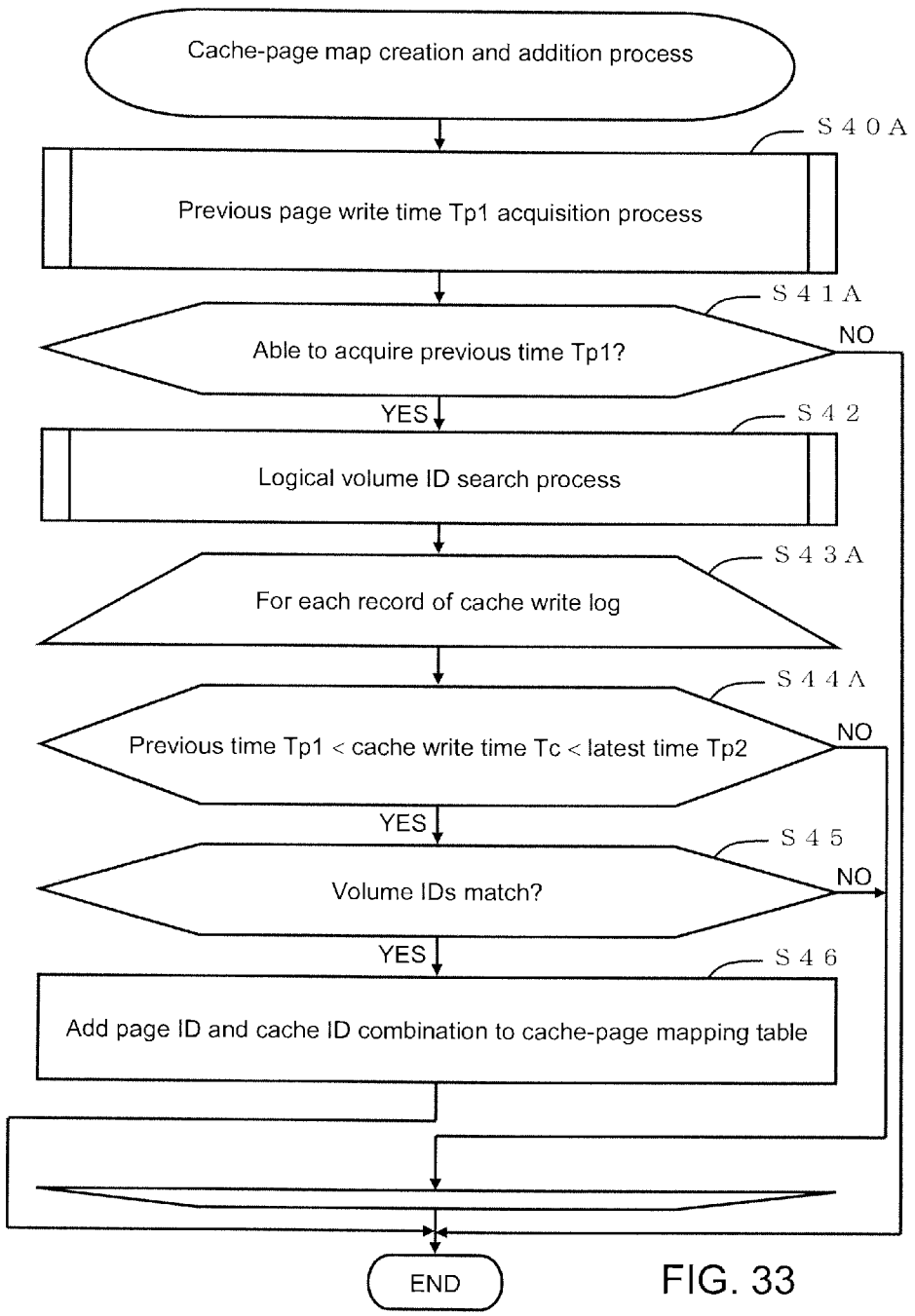
FIG. 33 is a flowchart showing a cache-page mapping process related to a third example.

Consequently, in the cache-page mapping process of this example shown in FIG. 33, the cache-page mapping part P41 acquires the previous write time Tp1 for the target page 211 (S40A). The cache-page mapping part P41 determines whether or not it was possible to acquire the previous write time Tp1 with respect to the target page 211 (S41A).

In a case where it was not possible to acquire the previous write time Tp1 (S41A: NO), this processing ends. In a case where it was possible to acquire the previous write time Tp1 (S41A: YES), the cache-page mapping part P41 searches for the ID of the logical volume being used by the host 10 that wrote to the target page 211 (S42).

The cache-page mapping part P41 respectively executes S44A, S45, and S46 for each record of the cache write log table T402.

The cache-page mapping part P41 determines whether or not the time Tc of the write to the cache data 331 falls within the prescribed time Tp12 from the latest write time Tp2 to the previous write time Tp1 of the target page 211 (S44A).

In a case where the cache data 331 write time Tc does not fall within the prescribed time Tp12 (S44A: NO), the cache-page mapping part P41 moves to the next record. In a case where the cache data 331 write time Tc falls within the prescribed time Tp12 (S44A: YES), the cache-page mapping part P41 determines whether or not the ID of the logical volume being used by the host 10 that updated the cache data 331 and the volume ID retrieved in S43 are a match (S45).

In a case where the two volume IDs match (S45: YES), the cache-page mapping part P41 adds a new record to the cache-page mapping table T412 (S46).

This example, which is configured like this, also achieves the same effects as the first example. In addition, this example can also be applied in a case where the cache data 331 is updated first, and the page 211 is updated thereafter. Since the application program 11 is able to update the frequently used cache data 331 first, it is possible to respond quickly to a request from the user terminal.

Furthermore, the present invention is not limited to the respective examples described hereinabove. A person of ordinary skill in the art will be able to make various additions and changes without departing from the scope of the present invention.

The present invention, for example, can also be expressed as either a computer program or a computer system as described below.

"Aspect 1

A computer program for causing a computer to function as a management apparatus for managing a computer system comprising a storage apparatus, which provides a logical volume to a host computer, and a cache apparatus, which is used by the above-mentioned host computer, wherein a portion of data stored in a storage area of a prescribed size inside the above-mentioned logical volume is stored in the above-mentioned cache apparatus as cache data, the computer program causing the above-mentioned computer to carry out the steps of:

detecting a first access request by the above-mentioned host computer with respect to data of the above-mentioned storage area in the above-mentioned logical volume;

detecting a second access request by the above-mentioned host computer with respect to the above-mentioned cache data in the above-mentioned cache apparatus;

detecting a corresponding relationship between the data of the above-mentioned storage area in the above-mentioned logical volume and the above-mentioned cache data of the above-mentioned cache apparatus; and computing the total number of access requests with respect to the data of the above-mentioned storage area based on the above-mentioned first access request and the above-mentioned second access request.

Aspect 2

A computer system, which comprises a host computer, a storage apparatus for providing a logical volume to the above-mentioned host computer, a cache apparatus, which is used by the above-mentioned host computer, and a management apparatus, which is coupled to the above-mentioned host computer, the above-mentioned storage apparatus, and the above-mentioned cache apparatus, wherein a portion of data stored in a storage area of a prescribed size inside the above-mentioned logical volume is stored in the above-mentioned cache apparatus as cache data, and the above-mentioned management apparatus comprises a microprocessor, a storage device for storing a prescribed computer program to be used by the above-mentioned microprocessor, and a communication interface circuit for communicating with the above-mentioned host computer and the above-mentioned storage apparatus, wherein the microprocessor, in accordance with executing the above-mentioned prescribed computer program:

detects a first access request by the above-mentioned host computer with respect to data of the above-mentioned storage area in the above-mentioned logical volume;

detects a second access request by the above-mentioned host computer with respect to the above-mentioned cache data in the above-mentioned cache apparatus;

detects a corresponding relationship between the data of the above-mentioned storage area in the above-mentioned logical volume and the above-mentioned cache data of the above-mentioned cache apparatus; and computes the total number of access requests with respect to the data of the above-mentioned storage area based on the above-mentioned first access request and the above-mentioned second access request.

REFERENCE SIGNS LIST 1, 10 Host computer
2, 20 Storage apparatus
3, 30 Cache apparatus
4 Management apparatus
40 Management server

The invention claimed is:

1. A computer system comprising:
a host computer;
a storage apparatus configured to provide a logical volume to the host computer;
a cache apparatus configured to cache data of the logical volume; and
a management apparatus configured to store a computer program;
wherein the logical volume includes a plurality of pages corresponding to tiers, the tiers comprising multiple types of storage devices,
wherein the computer program causes the management apparatus to:
(1) receive information about cache I/O loads and information about storage I/O loads;
(2) for each page, calculate I/O load referring a storage I/O load of the each page and a cache I/O load of cache data corresponding to the each page; and
(3) decide a page to be migrated between tiers, referring the calculated I/O load; and
(4) instruct a migration of the decided page to the corresponding tier.

2. The computer system according to claim 1, wherein a size of cache data is smaller than a size of page.

3. The computer system according to claim 1, wherein the referred cache I/O load is about a number of read request, and the referred storage I/O load is about a number of read request and a number of write request.

4. The computer system according to claim 1, wherein the cache apparatus is separated from the host computer.

5. The computer system according to claim 1, wherein types of information about cache I/O loads and information about storage I/O loads are log.

6. The computer system according to claim 1,
wherein the host computer is configured to write data to the cache apparatus and the storage apparatus, and
wherein the host computer is configured to read data from the cache apparatus when the read data is stored in the cache apparatus.

7. A non-transitory computer readable medium storing therein at least one computer program, which, when executed, causes a management apparatus of a computer system to perform a method, the computer system comprising:
a host computer;
a storage apparatus configured to provide a logical volume to the host computer; and a cache apparatus configured to cache data of the logical volume;

wherein the logical volume includes a plurality of pages corresponding to tiers, the tiers comprising multiple types of storage devices, the method comprising:

(1) receiving information about cache I/O loads and information about storage I/O loads;

(2) for each page, calculating I/O load referring a storage I/O load of the each page and a cache I/O load of cache data corresponding to the each page; and (3) deciding a page to be migrated between tiers, referring the calculated I/O load; and (4) instructing a migration of the decided page to the corresponding tier.

8. The non-transitory computer readable medium according to claim 7, wherein a size of cache data is smaller than a size of page.

9. The non-transitory computer readable medium according to claim 7, wherein the referred cache I/O load is about a number of read request, and the referred storage I/O load is about a number of read request and a number of write request.

10. The non-transitory computer readable medium according to claim 7, wherein the cache apparatus is separated from the host computer.

11. The non-transitory computer readable medium according to claim 7, wherein types of information about cache I/O loads and information about storage I/O loads are log.

12. The non-transitory computer readable medium according to claim 7, wherein the host computer is configured to write data to the cache apparatus and the storage apparatus, and wherein the host computer is configured to read data from the cache apparatus when the read data is stored in the cache apparatus.

* * * * *